US008898080B1

(12) United States Patent
Nolan et al.

(10) Patent No.: US 8,898,080 B1
(45) Date of Patent: Nov. 25, 2014

(54) COUNTERPARTY CREDIT IN ELECTRONIC TRADING SYSTEMS

(75) Inventors: Kieron Nolan, London (GB); Simon Holmes, London (GB); William Dowling, Sydney (AU); Darryl Young, Sydney (AU)

(73) Assignee: Patshare Limited, London (GB)

( * ) Notice: Subject to any disclaimer, the term of this patent is extended or adjusted under 35 U.S.C. 154(b) by 1732 days.

(21) Appl. No.: 11/212,458

(22) Filed: Aug. 25, 2005

(51) Int. Cl.
*G06Q 40/00* (2012.01)

(52) U.S. Cl.
CPC .................................... *G06Q 40/00* (2013.01)
USPC .............................. 705/37; 705/35; 705/36 R

(58) Field of Classification Search
None
See application file for complete search history.

(56) References Cited

U.S. PATENT DOCUMENTS

| | | | |
|---|---|---|---|
| 5,802,499 A * | 9/1998 | Sampson et al. ................. | 705/35 |
| 5,873,071 A * | 2/1999 | Ferstenberg et al. ........ | 705/36 R |
| 6,112,189 A * | 8/2000 | Rickard et al. .............. | 705/36 R |
| 6,317,727 B1 | 11/2001 | May | |
| 6,824,049 B2 | 11/2004 | Lee et al. | |
| 7,080,033 B2 | 7/2006 | Wilton et al. | |
| 7,089,205 B1 * | 8/2006 | Abernethy ....................... | 705/37 |
| 7,155,410 B1 * | 12/2006 | Woodmansey et al. .......... | 705/37 |
| 7,231,363 B1 * | 6/2007 | Hughes et al. ................... | 705/37 |
| 7,330,834 B1 * | 2/2008 | LaPierre .......................... | 705/37 |
| 7,333,952 B1 | 2/2008 | Neyman et al. | |
| 7,340,430 B2 * | 3/2008 | Mulinder et al. ................ | 705/37 |
| 7,386,498 B1 * | 6/2008 | Miyazaki et al. ................ | 705/37 |
| 7,526,446 B2 * | 4/2009 | Aguais et al. .................... | 705/38 |
| 7,542,941 B1 * | 6/2009 | Cohen .............................. | 705/37 |
| 7,571,134 B1 * | 8/2009 | Burns et al. ...................... | 705/37 |
| 7,653,588 B2 * | 1/2010 | Tilly et al. ........................ | 705/37 |
| 7,805,358 B2 * | 9/2010 | Claus et al. ...................... | 705/37 |
| 7,844,536 B1 * | 11/2010 | Andrews et al. ................. | 705/37 |
| 2001/0027437 A1 * | 10/2001 | Turbeville et al. .............. | 705/38 |
| 2002/0091617 A1 * | 7/2002 | Keith ................................ | 705/37 |
| 2002/0099641 A1 * | 7/2002 | Mills et al. ....................... | 705/37 |
| 2002/0107781 A1 * | 8/2002 | Neyman et al. .................. | 705/37 |
| 2002/0133455 A1 * | 9/2002 | Howorka et al. ................ | 705/37 |
| 2002/0138396 A1 * | 9/2002 | Brown et al. .................... | 705/37 |
| 2002/0169706 A1 * | 11/2002 | Chandra et al. ................. | 705/37 |
| 2002/0178102 A1 * | 11/2002 | Scheinberg et al. ............ | 705/37 |
| 2002/0188552 A1 * | 12/2002 | Kavounas et al. ............... | 705/37 |
| 2003/0069830 A1 | 4/2003 | Morano et al. | |
| 2003/0069836 A1 * | 4/2003 | Penney et al. ................... | 705/37 |
| 2003/0083973 A1 * | 5/2003 | Horsfall ........................... | 705/37 |
| 2003/0115130 A1 * | 6/2003 | Stump ............................. | 705/37 |
| 2003/0120575 A1 * | 6/2003 | Wallman ......................... | 705/36 |
| 2003/0233308 A1 | 12/2003 | Lundberg et al. | |
| 2004/0024692 A1 * | 2/2004 | Turbeville et al. .............. | 705/38 |

(Continued)

*Primary Examiner* — Gregory Johnson
(74) *Attorney, Agent, or Firm* — Dickstein Shapiro LLP

(57) ABSTRACT

There is disclosed an electronic trading system and associated methods adapted to automatically match submitted orders on the basis of price, quantity limitations, and lines of credit defined by potential counterparties. Lines of credit are divided into time based tranches relating to the maturity of an instrument to be traded, and a number of schemes are used to manage the tranches in order to improve control and use of remaining credit, which can be replenished manually or automatically. Traders are grouped into desks, and orders submitted by a trader may be matched on behalf of any of several credit centers defined per trader desk. Lines of credit may be held in various ways such as at the level of counterparty trading organizations, and at the level of counterparty credit centers. A variety of mechanisms are used to numerically interrelate lines of credit and different tradeable instruments, and a permissioned user can select how these mechanisms are used to control display of the market and matching of orders for traders in their trading organization.

19 Claims, 14 Drawing Sheets

(56) References Cited

U.S. PATENT DOCUMENTS

| | | | |
|---|---|---|---|
| 2004/0034591 A1* | 2/2004 | Waelbroeck et al. | 705/37 |
| 2004/0059666 A1 | 3/2004 | Waelbroeck et al. | |
| 2004/0064397 A1* | 4/2004 | Lynn et al. | 705/37 |
| 2004/0088242 A1* | 5/2004 | Ascher et al. | 705/37 |
| 2004/0128222 A1* | 7/2004 | Turbeville et al. | 705/37 |
| 2004/0148248 A1* | 7/2004 | Allen et al. | 705/37 |
| 2004/0181474 A1* | 9/2004 | Grubb et al. | 705/35 |
| 2004/0186806 A1* | 9/2004 | Sinclair et al. | 705/37 |
| 2004/0236669 A1* | 11/2004 | Horst et al. | 705/37 |
| 2005/0119964 A1* | 6/2005 | Brady et al. | 705/37 |
| 2005/0125329 A1* | 6/2005 | Gerhart et al. | 705/37 |
| 2005/0149428 A1* | 7/2005 | Gooch et al. | 705/37 |
| 2005/0160024 A1* | 7/2005 | Soderborg et al. | 705/37 |
| 2005/0203826 A1* | 9/2005 | Farrell et al. | 705/37 |
| 2005/0240513 A1* | 10/2005 | Merold | 705/37 |
| 2005/0273407 A1* | 12/2005 | Black et al. | 705/35 |
| 2006/0041498 A1* | 2/2006 | Hausman et al. | 705/37 |
| 2006/0047590 A1* | 3/2006 | Anderson et al. | 705/35 |
| 2006/0059068 A1* | 3/2006 | Glinberg et al. | 705/35 |
| 2006/0080216 A1* | 4/2006 | Hausman et al. | 705/37 |
| 2006/0129472 A1* | 6/2006 | Harrington | 705/35 |
| 2006/0161497 A1* | 7/2006 | Penney | 705/37 |
| 2006/0173693 A1* | 8/2006 | Arazi et al. | 705/1 |
| 2006/0173771 A1* | 8/2006 | Johnston | 705/37 |
| 2006/0218071 A1* | 9/2006 | Sweeting | 705/37 |
| 2007/0150397 A1* | 6/2007 | Rossen et al. | 705/36 R |
| 2008/0040256 A1 | 2/2008 | Neyman et al. | |
| 2008/0052214 A1* | 2/2008 | Martinez et al. | 705/37 |
| 2008/0215477 A1* | 9/2008 | Annunziata | 705/37 |
| 2009/0076982 A1* | 3/2009 | Ginberg et al. | 705/36 R |
| 2009/0187511 A1* | 7/2009 | Doornebos et al. | 705/36 R |
| 2010/0017345 A1* | 1/2010 | Hadi et al. | 705/36 R |
| 2013/0262286 A1* | 10/2013 | Cottle | 705/37 |

* cited by examiner

| Full Trading Name | Line Type | Inherit Limits | Is Suspended | >0 to 6Mth Limit | >0 to 6Mth Used | >0 to 6Mth Remaining | >6Mth to 3Yr Limit | >6Mth to 3Yr Used | >6Mth to 3Yr Remaining | >3 to 10Yr Limit | >3 to 10Yr Used | >3 to 10Yr Remaining | >10 to 30Yr Limit | >10 to 30Yr Used | >10 to 30Yr Remaining |
|---|---|---|---|---|---|---|---|---|---|---|---|---|---|---|---|
| BANK A LDN | loanequiv | Global | | Unlimited | | Unlimited | Unlimited | | Unlimited | | | | | | |
| BANK A LDN | loanequiv | ☑ | ■ | 600.00 | | 600.00 | 600.00 | | 600.00 | 1000 | | 1,000.00 | 500.00 | | 500.00 |
| BANK A FFT | loanequiv | | ■ | | | | | | | | | | | | |
| BANK A LDN | loanequiv | ☑ | ■ | | | | | | | | | | | | |
| BANK A NYK | loanequiv | | ■ | | | | | | | | | | | | |
| BANK A PAS | loanequiv | ☑ | ■ | | | | | | | | | | | | |
| BANK A SGP | loanequiv | | ■ | | | | | | | | | | | | |
| BANK C PAS | loanequiv | Global | ■ | 1,500.00 | | 1,500.00 | 1,000.00 | | 1,000.00 | | | | | | |
| BANK C PAS | loanequiv | | | | | | | | | | | | | | |

| Inst Code | Default Pc | Default Rc | Default Pnc | Default Rnc | Override Pc | Override Rc | Override Pnc | Override Rnc |
|---|---|---|---|---|---|---|---|---|
| USD 1Y.sb | 0.042012 | 0.041740 | 1.392452 | 1.293722 | | | | |
| USD 2Y.sb | 0.119542 | 0.118460 | 2.635958 | 2.191531 | 0.120000 | 0.119000 | 2.700000 | 2.200000 |
| USD 3Y.sb | 0.192858 | 0.190960 | 4.138778 | 3.341541 | | | | |
| USD 4Y.sb | 0.263543 | 0.260848 | 5.750319 | 4.523150 | | | 6.000000 | 4.800000 |

Fig 11

COUNTERPARTY CREDIT IN ELECTRONIC TRADING SYSTEMS

FIELD OF THE INVENTION

The present invention relates to computerised trading systems, and in particular to computerised trading systems and associated methods which implement credit management of trades between parties.

BACKGROUND OF THE INVENTION

Computerised trading systems which match bids and offers, orders, or other specified requests of parties, in order to make a trade, are widely disclosed in the prior art. Some systems provide a user with information about existing bids and offers and enable the user to make a trade, while other systems automatically form a trade from a bid and offer when they are found to match. However, to provide an anonymous market in which counterparties are unaware of each other's identities until a trade has been completed, client terminals are generally provided with a less than complete view of the bids and offers available. In particular, the identity of the party making a bid or offer is often not displayed at a client terminal.

Financial institutions generally wish to impose limits on the degree to which they and their representatives trade with other institutions, to control the risk associated with the trades. This risk may be associated with likelihood of a counterparty defaulting on a trade before settlement. In markets for contract instruments, such as interest rate derivatives which establish an ongoing contract between parties relating to interest rate movements for many months or years in the future, the control of exposure to a counterparty ceasing to exist or defaulting on a contract for other reasons can become of paramount importance.

The control of credit risk exposure is difficult to implement in a fully anonymous market. In traditional voice broking markets a compromise is often reached by agreeing trades anonymously on a provisional basis, subject to a subsequent credit check. For example, it may be desirable for a central server to maintain details of gross counterparty credit limits which cover each possible combination of parties. These limits can usually be defined by individual parties.

There are a number of deficiencies in the related prior art which the invention seeks to address.

In particular it is an object of the invention to provide an improved electronic trading system in which potential trades are matched on the basis of mutual credit between the parties as well as other parameters such as price and quantity parameters.

Another object of the invention is to provide an electronic trading system in which the credit control of trades is convenient to administer, and minimises the degree to which potential trades are unduly blocked on grounds of credit.

Another object of the invention is to provide an electronic trading system in which the participants such as traders, trader desks and trading institutions, and the associated aspects of the credit system are able to interoperate in a flexible and convenient manner.

Another object of the invention is to provide improved methods of controlling the extent to which credit is allocated to different maturities or other time banded aspects of traded instruments, and to provide consistent and beneficial schemes for adjusting and moving allocated credit between different time bands.

It is also an object of the invention to provide more flexible and appropriate methods for association of risk and credit between different tradeable instruments, and to provide users of the system with improved control over such methods.

It is also an object of the invention to provide an electronic trading system in which an anonymous market is maintained through improvements in the way tradeable instruments and market information are displayed according to the degree to which associated trades may be limited by the credit system.

It is also an object of the invention to provide a system in which the amount of credit needed for a given set of orders to be matched is reduced or minimised.

SUMMARY OF THE INVENTION

In one particular aspect, the present invention provides an electronic trading system which can automatically match orders, allowing traders certainty of execution at time of order entry. This is achieved by maintaining centralised credit data, which are adjusted as trades are completed and credit limits are updated. Credit parameters can be changed with immediate effect, and are preferably stored at the central market server. The credit system used allows each trading organisation to set up their own model to control trading with other organisations. This model can be very simple and rapid to set up, and require no further maintenance, or by degrees, can be complex and highly integrated with a real-time bank credit system.

The credit system is preferably not implemented as a "module" as such but an integrated part of a single threaded, automated, multi-chaining matching process, designed to scale to a fully automated market.

The trading system is not restricted to executing trades between legal entities, such as financial institutions or individuals, however, and can be used to match any willing parties with any counterparty that they see fit, be that a hypothetical construct, individual person, or a logical label standing for anything else.

Credit limit is allocated into up to any number of user-defined tranches, which represent the division of credit limit into administratively-convenient consecutive blocks of time starting from today and extending as far as the longest conceived-of credit-event horizon (typically 50 years). Optional expenditure of credit limit from tranches of a longer tenor than the trade may be allowed when a tranche becomes exhausted.

A trading organisation may chose whether to have each tranche's credit limit in all but the shortest tranche levelled to the shorter adjacent tranche to avoid eccentric limit distribution.

Credit limit may be input as separate buy and sell, or Pay and Receive data and used accordingly depending on whether a party pays or receives in the trade (analogous to buying or selling securities), or combined into a single value.

Trades in currencies other than that used to express the limit use up limit subject to foreign exchange conversion and optionally subject to foreign exchange volatility.

Credit expenditure can take account of a counterparty either having or not having a collateralised (post-trade credit risk-reducing) agreement in place with the trading organisation setting the credit limits, or the parties defining one or more mutual clearing systems.

Credit limit may be expressed as a willingness to trade a certain amount of an anchor instrument defined by a trading organisation, in which case trades in other instruments attract a limit expenditure based on a system factor, such as a modified-duration ratio, to the anchor.

Risk factors for loan equivalence are separately available for paying and receiving trades, and for collateralised and non-collateralised counterparties, making a total of four factors per instrument supplied by the system, although further or alternative factors can be used.

As many trading units of a counterparty as a trading organisation wishes can be defined. This allows for notional accounts to exist that result in trades done in the name of the desired legal entity but with account parameters set. These accounts are deemed the children of the legal entity, which is the parent. The system supports any number of levels of grand-children, great-grandchildren etc.

The defining of accounts allows a trading organisation to define and quantify a preference to trade with specified counterparties via a clearing system or to trade using a central counterparty.

Traders are grouped into desks, and each desk may have a hierarchy of legal entities in whose names the traders on that desk may trade. The credit system will respect the order of this hierarchy, and where possible enable matches between the two traders' preferred names. Where limit does not exist between preferred names the credit system will allow trades in the next available allowed name.

Chains (multiple-leg contingent trades) involving any number of orders from a number of traders are allowed to match, subject to the cumulative credit limit expenditure required by all trades within the chain. Should any one pair of orders within the chain be restricted in size of trade by only a partial amount of limit then all trades in the chain are reduced pro-rata to allow the maximum permissible execution. The same user may appear many times in the chain, including when the trader's trades are occurring in identical limit tranches.

A full API is published, so a user is not confined to a proprietary interface for using and controlling the system. All functionality that a user has permission to execute may be executed via the API.

"Name check rejection" is communicated to authorised users at a trading organisation at specified times during the day. This informs users that the system has blocked possible trades because they have not entered enough limit with specified counterparties.

Each order preferably has an associated tradability flag, for example set to Yes/No/Don't Know by the credit system. The Yes/No values signify whether this order can result in a trade with the observing trader of at least a system-wide minimum size. This flag can be different for each trader observing the order, depending on the bilateral limits available between their desks (in order of priority) and those of the trader who entered the order. This flag can be used by a user interface to distinguish for the trader those orders that can trade from those that cannot, when it set to Yes or No. The highly efficient nature of the distribution process means that no throttling or filtering of credit painting or distribution is required.

A trading organisation has control of the Tradability flag for brokers and traders, and can force the flag to always be Don't Know for either or both of these types of user.

The trading system has "anti-gaming" protection, so that behaviour that is likely to compromise order anonymity via the Tradability flag instead sets that flag to Don't Know for a configurable length of time. Such behaviour includes changing credit limit or not entering credit for enough counterparties or entering credit for all but a certain number of counterparties.

The system also provides an order Tradability flag that is set by reference to an order's specified Minimum Fill.

The system allows the price on an order to be dependent on a base value and a further increment which depends on the creditworthiness of the order-placer with the observing user.

As well as providing an electronic or computerised trading system implementing the above features, the invention also provides methods of trading and of operating a trading system according to these features, methods of providing facilities for such trading, and computer readable media carrying computer program code implementing parts or the whole of the system and methods. The invention also provides trader terminals incorporating the user interface features discussed herein.

According to one aspect, the invention provides an electronic trading system for use in trading financial instruments between parties, comprising:

an order store for recording order parameters defining orders submitted on behalf of the parties for trading financial instruments;

a credit store recording a set of credit parameters maintained for each party, each set of credit parameters defining limits of credit to determine the credit allowability of trades between the party and other parties;

a credit management mechanism for managing the credit parameters; and an order matching engine for generating trades by matching orders contained in the order store subject to the limits of credit.

According to another aspect the invention provides an electronic trading system for use in trading financial instruments between parties, comprising an order matching engine for generating trades by matching orders submitted on behalf of the parties subject to limits of credit specified by credit parameters, wherein the credit parameters comprise credit parameters defined for a first party to limit the credit available for trades between the first party and one or more of the other parties, and these parameters comprises credit tranche parameters defining amounts of credit in each tranche, each tranche representing a distinct future time interval, each financial instrument relating to one or more of said future time intervals.

According to a further aspect the invention provides an electronic trading system for use in trading financial instruments between parties, comprising a credit assessment mechanism adapted to assess the amount of credit, allocated for a first party for trades with one or more other parties, that is available for the first party to trade on an order submitted by one of the other parties. For example, the credit to be assessed may be expressed in a first currency, and the credit assessment mechanism may then be adapted to convert a value associated with the order and expressed in a second currency into said first currency so that the amount of credit available can be assessed in the first currency.

According to a further aspect the invention provides an electronic trading system for use in trading financial instruments between parties, comprising an order matching engine for generating trades by matching orders submitted by traders on behalf of the parties, the system being adapted to record trading accounts relating to the parties, and comprising a trade mechanism to post-process trades, generated by the matching engine, using selected trading accounts relating to the parties involved in a trade.

According to a further aspect the invention provides an electronic trading system for use in trading financial instruments between parties, comprising an order matching engine for generating trades by matching orders submitted on behalf of the parties by traders who are logically grouped into groups of one or more traders, the system being adapted to record a plurality of parties on behalf of which an order submitted by a trader in a particular group may be matched.

According to a further aspect the invention provides an electronic trading system for use in trading financial instruments between parties, by matching of orders submitted by traders on behalf of the parties, the matching of orders also being subject to lines of credit between the parties represented as sets of credit parameters, the system comprising a user interface displaying, to a first trader permitted to trade on behalf of one or more first trader parties, data relating to a plurality of said orders, including displaying an indicator, having a plurality of possible states, associated with each order, at least some of the states of the indicator representing whether the sets of credit parameters maintained for the first trader parties, and for one or more parties associated with the submitted order, permit the first trader to make a trade including the order on behalf of one of the first trader parties.

For example, the displayed data relating to an order may be coloured according to the state of the indicator.

BRIEF DESCRIPTION OF THE DRAWINGS

Embodiments of the invention will now be described, by way of example only, and with reference to the accompanying drawings, of which:

FIG. 8 is a window allowing a user to adjust credit parameters and limits for particular counter parties;

FIG. 11 shows a window enabling a user to enter over-ride loan equivalence factors;

DETAILED DESCRIPTION OF PREFERRED EMBODIMENTS

Market Participant Structures

The present invention provides a computerized trading system, including a central market server and distributed user terminals, and corresponding methods. The described system is intended primarily for trading financial instruments, especially interest rate swap instruments, forward rate agreements and overnight index swaps, and strategy instruments such as spreads combining two or more such underlying instruments. However, it may also be used to trade a variety of other types of commodity and instrument. The system is also adapted to provide anonymous trading between parties while providing an effective degree of credit control, and to provide automatic matching of orders submitted to the system.

Figure 1:
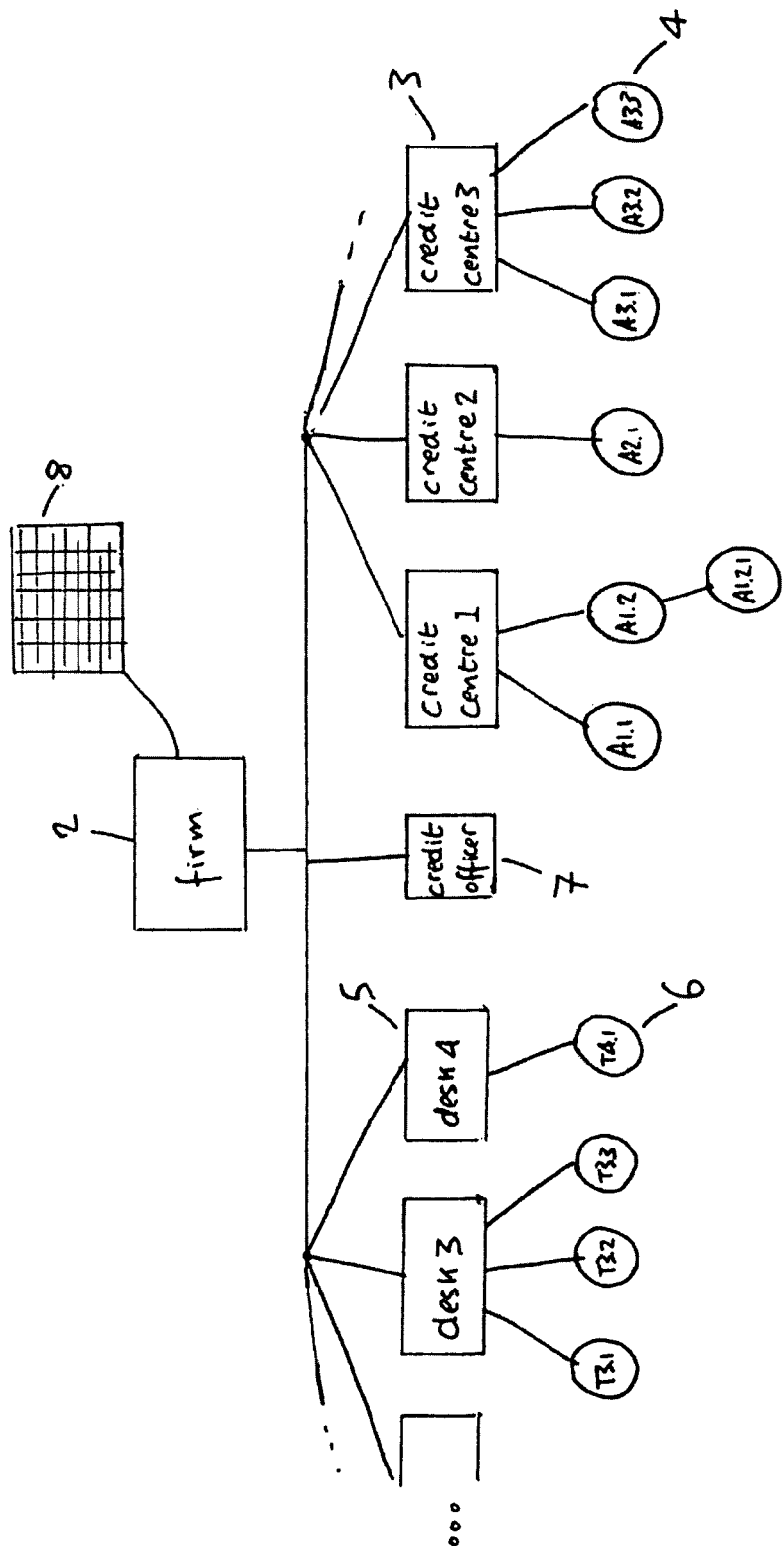
FIG. 1 shows a hierarchy of entities and parties used to illustrate the invention.

FIG. 1 illustrates a hierarchy of parties and entities in the context of which the system and methods of the present invention will be described, although other arrangements could be used. At the top level a number of firms 2 are defined. Each firm is typically a banking business or similar institutional entity, which becomes a business client of the operator of the trading system. Associated with each firm are one or more credit centres 3. An order may be submitted by a trader or trader desk on behalf of a firm, or on behalf of one or more credit centres. Therefore, generally a firm or credit centre acts as a legal entity, or party, for whom orders are submitted to and trades are completed by the system. For example, if a firm 2 is Bank of Minnesota, corresponding credit centres 3 may be Bank of Minnesota, London branch, and Bank of Minnesota, New York branch. Associated with each credit centre 3 are one or more accounts 4, which are used for settlement of trades. Accounts can be at a single level below a credit centre 3 or can form a hierarchy or tree.

Associated with each firm are also one or more trader desks 5. Each desk may typically be located at a geographical site of the firm, but this need not be the case. A desk 5 is a grouping of one or more traders 6, or users, and each trader preferably belongs to just one desk. Each firm also has one or more credit officers 7, who may also be traders associated with desks.

Before using the system to trade, various parameters must be set for or by a firm at different levels in the hierarchy of FIG. 1. Associated with each firm must be a credit matrix 8, or a collection of credit parameters, establishing the extent to which trades may be completed between credit centres 3 of this firm, and other firms and their credit centres. The credit matrix is set up and adjusted, from time to time, by the credit officers 7 of a firm. For trading with some other firms, this firm may wish to define credit parameters at the top, firm level, and permit trading with some or all of the other firms on the basis of this top level credit arrangement.

Equally, credit parameters can be defined for particular credit centres of other firms, and also for accounts 4 of other firms if required, so that a mixture of tree-based credit inheritance and explicit credit can be used. When two different firms have defined credit parameters for each other, orders may be submitted by the two firms as such, or in the names of particular credit centres. If these orders match on price and other order parameters, they can also be checked against the amount of relevant credit defined by each firm for the order matching credit centre of the other firm. If the credit checks are satisfactory, the trade may proceed. If not, it may be possible for the trade to proceed by changing the credit centre for one or both of the firms. The ways in which these processes are carried out are discussed in more detail below. The credit checking may occur before, during or after finding a match on price.

As well as credit parameters for counterparties, a number of other parameters are set at the "firm" level. These define, for example, the choice of method for calculating the amount of credit limit expended by a trade; the positions of the boundaries that apportion credit limit into discrete time intervals (tranches); how the limits in these tranches are managed for consistency and flexibility; and how these limits are replenished.

Other parameters are set at the "desk" level. Instruments which may be traded using the system are categorised at the top level by "boards", which are groups of products that share currency and/or strategy attributes, such as US dollar semibond interest rate swaps vs 6 meth USD libor. Each product is a group of "instruments" which share a unique set of economic attributes, such as Fixed Rate Day Count Basis and Payment Frequency. Each instrument has a defined set of economic attributes such as start and maturity date. Trader desks have associated parameters defining which boards, products and instruments may be traded by traders of that desk. Each trader has associated parameters defining which boards, products and instruments he may trade.

Associated with each trading desk of a firm is also a list of credit centres of that firm on whose behalf traders of the desk may trade. The list is ordered so that orders submitted by traders of a desk are matched, if possible, using the credit parameters of the credit centre with highest priority, but allowing matching using lower ranking credit centres if necessary.

System Overview

Figure 2:
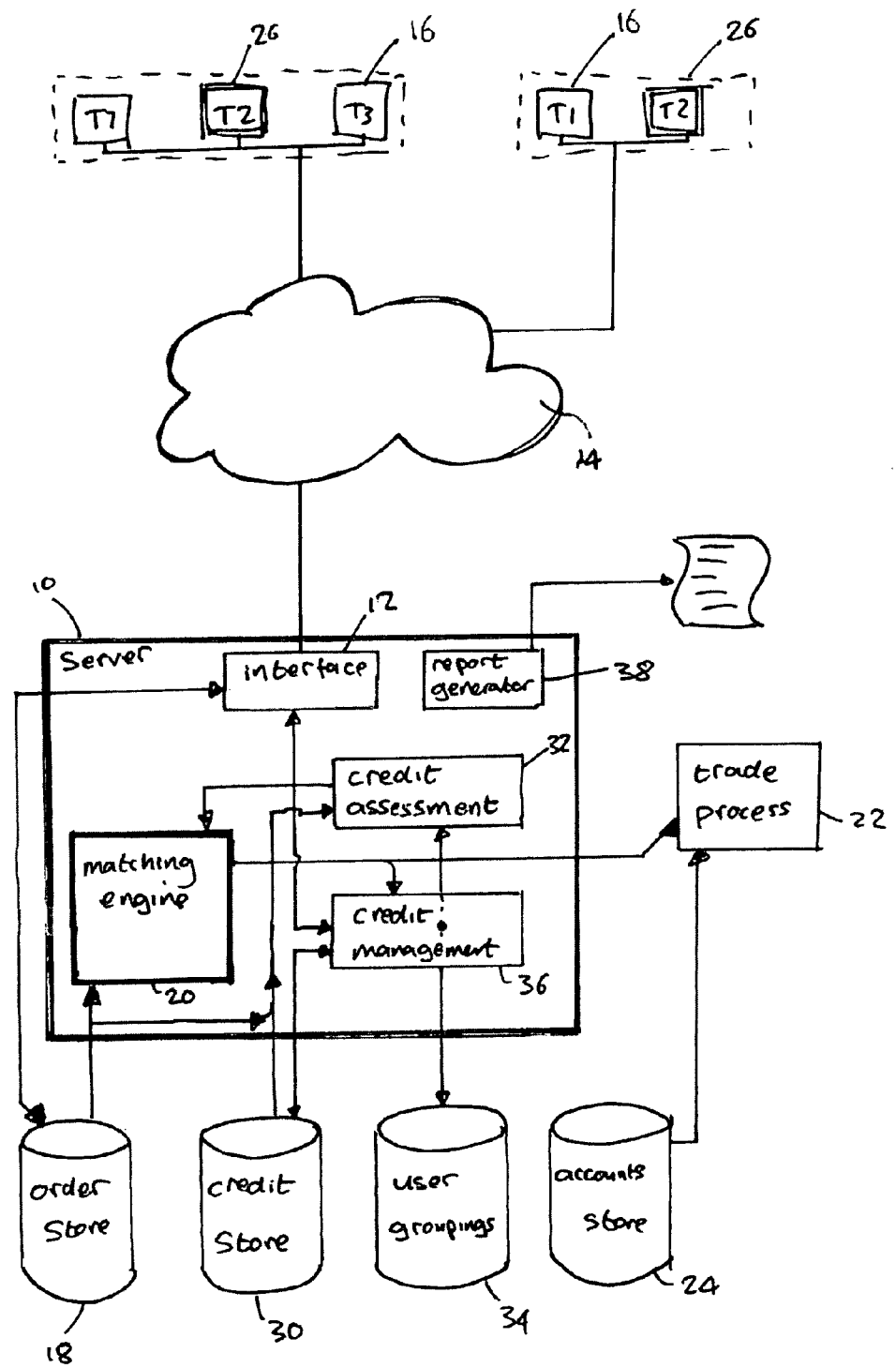
FIG. 2 is a schematic diagram of elements of an electronic trading system embodying the invention.

Referring now to FIG. 2 there is shown, schematically a suitable architecture for the computerised trading system of the present invention. The system comprises a central market server 10 connected via a terminal interface 12, over one or more networks 14, to a plurality of trading terminals 16. From a trading terminal a trader 6 may submit an order on behalf of a firm or credit centre (i.e. party) to trade a financial instrument known to the system. The order, defined by order parameters such as instrument, price and minimum size, is placed in an order store 18, along with other orders submitted by users on behalf of a number of different trading parties.

A trading terminal may, in practice, take a wide variety of forms. Some example implementations are a conventional personal computer or workstation executing an HTML browser, an excel spreadsheet, dedicated trading system terminal software, or other client application or process. Terminals may also operate automatically, for example using preset rules and parameters for submitting, amending, withdrawing and otherwise handling orders.

A matching engine 20 seeks to match orders together to complete trades. Successfully matched trades are notified to a trade process 22 which initiates completion and settlement of the trade on the basis of details of accounts 4 held in accounts store 24. Individual traders may wish to allocate trades for particular parties to selected accounts 4, and firms can set up hierarchies of trading accounts to effect this.

The terminal interface 12 provides, or at least partly implements an application program interface (API) the details of which are made fully available so that firms can prepare their own software for operating user terminals 16, or for integrating the trading system with their own existing systems. This functionality requires the API, in conjunction with the credit system, to provide non confidential data, and only a limited subset of confidential data, to the terminals. For example, users of a first firm may be permitted to see credit parameters set by the first firm, but will not be allowed to see credit parameters set by other firms. However, the API must still provide sufficient credit information for the market to operate effectively. To achieve this a credit painting scheme which provides traders with carefully controlled information regarding the credit status of submitted orders is implemented. The interface 12 also enables firms to connect their own automatic trading systems, so that orders can be placed and, if necessary amended and withdrawn, automatically.

Credit officers 7 and other users of a firm with special privileges are represented by special terminals 26. These users are entitled by the terminal interface, depending on permissions, to modify credit parameters held in credit store 30, and other parameters relating to the firm and its various components as illustrated in FIG. 1. Access to credit and other sensitive data is carefully controlled by a central permissions scheme according to user types, which include conventional trading users who cannot change credit parameters, trading credit officers who can trade and make any changes to the credit parameters of their trading organisation, and credit officers who can make changes to the credit parameters but cannot trade. A more detailed listing of the various users defined by the system is set out in the section "User roles and permissions" below.

When seeking to match orders to complete a trade, the matching engine 20 must find orders which both match on the basis of the order parameters and which satisfy the relevant credit parameters. The credit requirements of a particular order are determined by a credit assessment function 32 which for clarity is illustrated separately, but in practise preferably forms part of the matching engine 20. The credit assessment partly depends on parameters relating to the groupings of traders into desks, defined in user groupings store 34, for example upon the credit centre parties for which traders of a particular desk may trade.

The credit parameters set by a firm for a particular counterparty include credit limit tranches, the contents of which are consumed as trades that span or fall within those credit tranches are completed. Separate credit tranches may be set for different maturity dates or other time dependent aspects of financial instruments available to trade so that different credit exposure can be set for longer term and shorter term financial instruments. The credit tranches may be replenished automatically using daily user defined increments or in other ways. A credit management mechanism 36 is provided to control the credit parameters to carry out this and other operations, such as maintaining particular characteristics of distributions of credit limits over time, as discussed in more detail below.

A report generator 38 is provided to report to firms regarding the operation of the credit control system, for example by making periodic name check rejection reports regarding potential trades which failed to occur because of a lack of available credit. Reports may be issued at predefined times, or as required, and enable credit officers to take action to increase credit limits if necessary and appropriate. A firm with an order which was unable to form a trade with an order from another firm because of the other firm's credit limits is not informed of the identify of the other firm. The report generator may also report to a firm when tranches of credit it has set up are running low, for example when a tranche is 75%, 90% and 99% depleted.

Although the market server is illustrated in FIG. 2 as comprising a number of separate mechanisms or processes and data stores, in practice much of the credit system is preferably implemented as an integrated part of a single threaded, automated, multi-chaining matching process which also implements the matching engine 20, and is designed to scale to a fully automated market and the high performance that this implies. The matching engine is preferably programmed to assess continuously whether orders or groups of orders may trade, without a significant degradation of the matching engine's performance. This is achieved by use of an in-memory database.

In some embodiments, credit checking is carried out as part of the process of maintaining order books and preparing potential chains of linked orders. However, in other embodiments, to reduce computational load, the credit assessment function logic to check whether a trade is possible in terms of credit is only invoked once a price match occurs between orders. In a simple trading model this check could be performed by a stand-alone process that authorizes individual requests to trade, which would be a close analogue to the traditional human workflow, in which a trader might call a colleague in his credit department to authorize a trade. However, when groups of mutually dependent trades occur simultaneously as a result of matching an implied chain, an individual request for credit for each trade is not sufficient, as each trade can affect the remaining credit and therefore the possible trade size of the next trade. In this situation the entire group must be authorized/rejected, or all trade sizes scaled down by the appropriate factor to effect a partial authorisation. In this "parallel" scenario rules that govern the consequences to remaining credit limits of using credit limit produce a different outcome to that reached by executing the same trades in series. Furthermore the need to match on credit as well as price can result in a market with bids higher than offers, often referred to as a "crossed market", also known as "backwardation". Other counterparties that are able to deal with the two crossed parties can take advantage of this value and therefore produce a trade in another market via intermediate spreads between markets, thus utilising credit information before price match rather than only after price match.

Operation of the matching engine in chaining together multiple orders is described in greater detail in co-pending U.S. patent application Ser. No. 11/212,465, entitled "Order Matching in Electronic Trading Systems", filed on even date herewith, which is hereby incorporated by reference in its entirety for all purposes.

Figure 3:
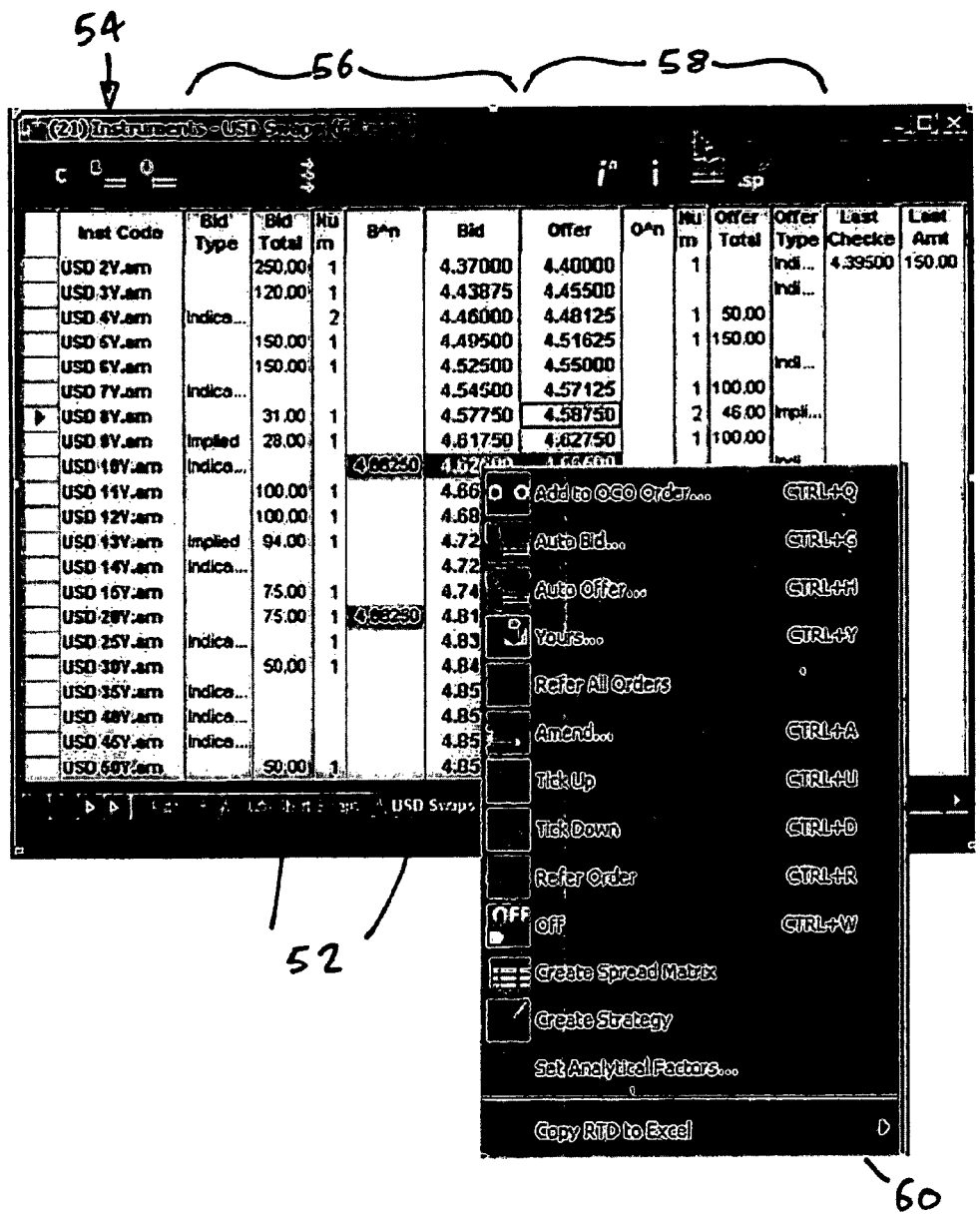
FIG. 3 is a view of some financial instruments provided for trading in the system of FIG. 2.

FIG. 3 shows an "instruments" user interface window 50 available to a user at a trading terminal 16, 26. The instruments window provides a number of tabs 52, at the bottom of the window, for selecting view of different product groups of financial instruments available for trade. The main portion of the window displays a scrollable table in which each row corresponds to one instrument of the tabbed product group, with instrument name codes provided in the left most column 54. The next five columns 56 provide a summary of the market state in terms of the best price of bid orders presently available, including a bid type field, a bid total of available amount of the instrument at the best price, the total number of bids and the current best bid price. Corresponding fields for offer orders presently available are provided in the subsequent five columns 58.

Figure 4:
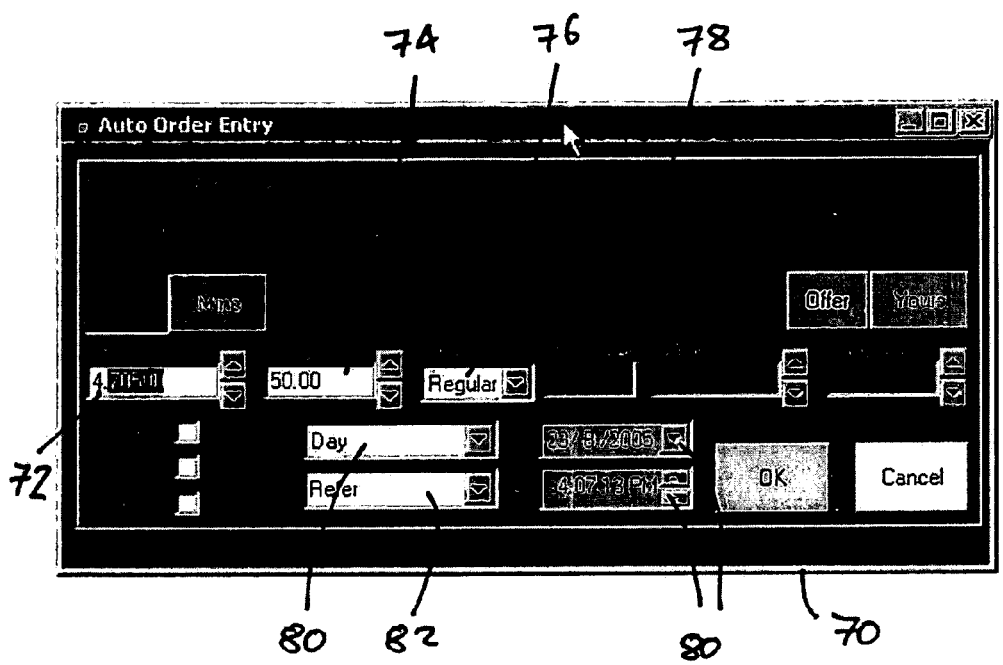
FIG. 4 shows a user interface window for submitting an order to trade an instrument of FIG. 3.

A trader can begin the process of submitting a bid or offer by clicking on the row for a particular instrument to bring up a selection box 60. This can provide a variety of functions, and can be used to bring up an automatic order entry window 70, illustrated for the "Auto bid" option in FIG. 4. This window is automatically populated with default order parameters for an order on the instrument selected. In FIG. 4 the parameters for a bid include a bid price 72, an order quantity 74, an order type 76, a minimum fill or visible ("iceberg") quantity 78, a duration 80 and an on-logoff behaviour 82. The trader can edit these parameters as desired before submitting the order. If the "Auto offer" option of FIG. 4 is selected then the offer price and offer amount fields are used instead of the bid price and bid amount in the order entry window 70.

Order types which are available in the present embodiment include regular orders which have no amount conditions, minimum fill orders which the matching engine will only match in a trade if the minimum size is filled, all-or-nothing orders which the matching engine will only trade if the full order quantity is filled, and iceberg orders which show only the specified minimum size to the market, which is replenished from the hidden quantity as trades complete.

The duration field is used to set a time, or time and date, for expiry of the order. Expiry may additionally be automatic at the end of a trading day, or longer durations may be permitted by the system, or immediately. The on-logoff behaviour allows the trader to specify whether, when logging off from the user terminal, the trader's order remains active (persists), is withdrawn (purged), or is held in an inactive state (referred).

Orders can be entered in other ways. For example, a spread matrix window is provided, in a manner configurable by a user, to provide ordering of spread combinations of two or more underlying instruments. Bids and offers can be entered for anticipated immediate execution by means of an order window populated with a matching price.

Figure 5:
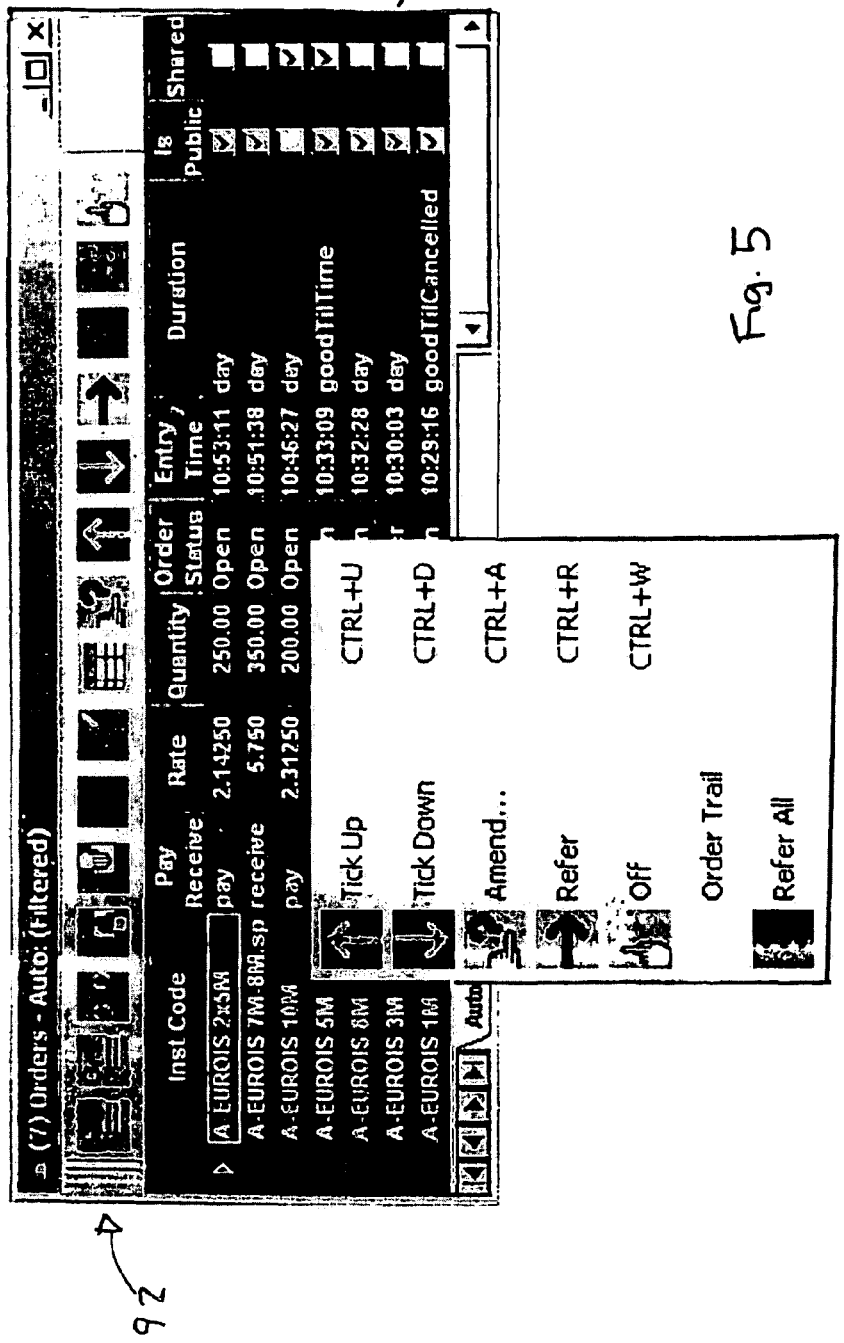
FIG. 5 shows a window displaying a list of orders submitted by a trader using the system of FIG. 2.

An order can have a status of open, amended, referred, withdrawn or expired. A list of the current orders of a firm, trader desk, trader or other defined grouping, including active and referred orders, is provided by an orders window 90 shown in FIG. 5. The user can apply filters to reduce the number and types of orders shown. The window provides details of, for each order, the instrument name code, whether the order is a bid or offer (pay/receive on interest rate swap), price, quantity, whether the order is visible to brokers working for the system operator ("is public"), and whether the order is shared with other traders on the same desk ("shared"). Orders can be shared as a user configurable default, or on a per order basis. Shared orders can be viewed by all traders on the same desk, and if any order details are amended, order ownership transfers to the trader that actioned the amendment. Extensive further information on each order is available.

Brokers acting for the system operator can be permissioned to enter orders on behalf of traders acting for firms. These brokers cannot amend or action any trader entered order, and traders can only effect a withdraw operation on orders entered by brokers on their behalf.

A toolbar 92 provides for quick execution of a variety of operations on this and other windows, including (from left to right) auto bid, auto offer, one order cancels other, mine (take bid), yours (take offer), implied order, custom spread, create spread matrix, amend order, tick order price up, tick order price down, refer order, renew order, refer all orders and withdraw order.

The one order cancels others option allows a parameterisable number of orders to be submitted in an OCO basket. If one order trades completely then the other orders in the basket are automatically withdrawn with no risk of transaction. If one order partially trades, the quantities of the remaining orders are reduced on a pro rata basis. The single "principal" order of an OCO basket, can take any place in an implied chain, while the other orders can only start and end chains.

All strategy orders are submitted and matched using system default duration ratios displayed in a hedge factor column of the appropriate view of the instruments window (FIG. 3), and the spread matrix window (not illustrated). These duration ratios are fixed at the start of a trading day, although intra day updates are possible in the event that the market moves significantly enough to make them unreasonable. Strategy orders imply into the outright markets of their legs, and outright orders will imply into strategy markets. A combination of two spreads sharing a leg will also imply into their associated combination spread markets. Minimum fill and all-or-nothing strategy orders are restricted to either starting or finishing implied transaction chains, and only the principal leg of an all-or-nothing order will imply.

Credit Management

Figure 6:
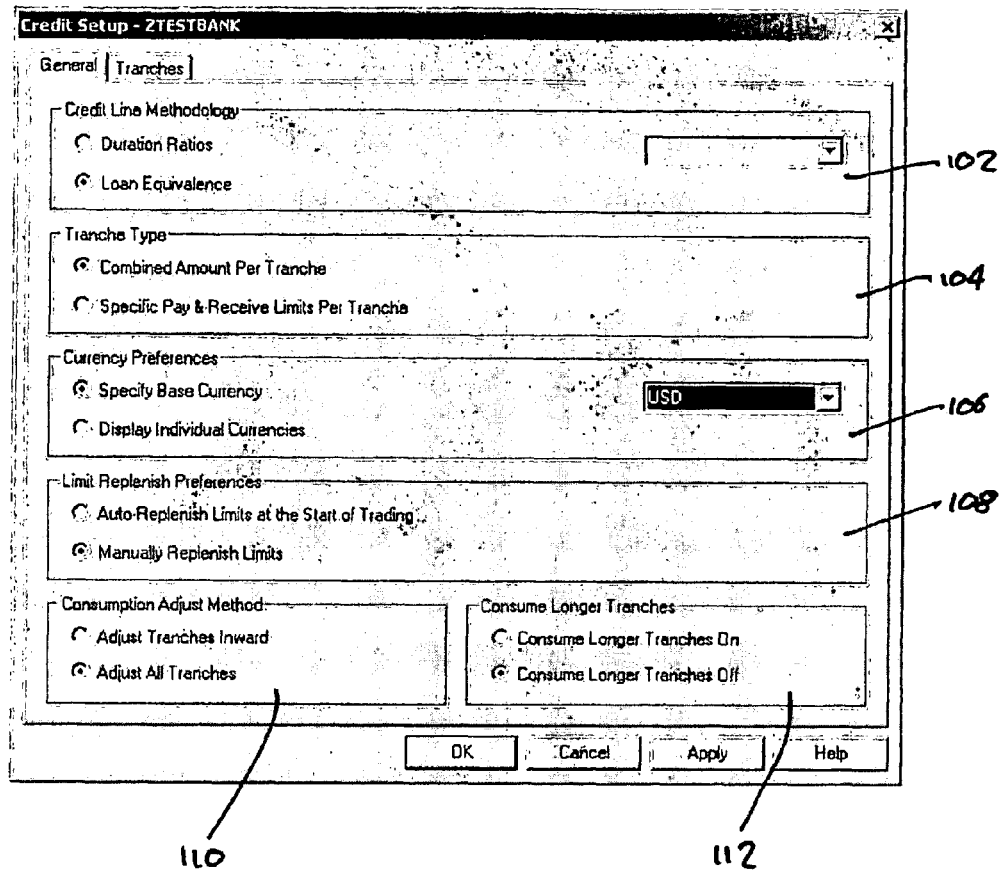
FIG. 6 shows a window allowing a user to set preferences for using the credit mechanisms of the trading system.

The system described so far requires firms to lodge credit limits with the central server. In order to minimise the impact of this limitation on trading opportunities the invention provides a number of ways of managing and using the credit limits, as discussed in the sections below. By way of introduction, FIG. 6 illustrates a configuration window for setting basic credit parameters relating to a particular firm. The window is divided into five regions.

A first region 102 permits radio button type selection of two different methodologies for defining the amount of credit required to complete a trade. Using the duration ratio system means that credit limits are maintained and used on the basis of a notional equivalent amount of a chosen anchor instrument. Any trade can be converted into an equivalent amount of this anchor using duration ratios and, if necessary, a foreign exchange rate, subject to rate volatility if required. The loan equivalent system, or more generally a risk factor system, is more complex. A transaction in a given instrument incurs a credit cost based on expected financial loss in the event of a default. Credit analytics can be user or system supplied and updated.

A second region 104 permits a firm to specify either separate tranches of credit for either side of a transaction, such as pay and receive sides of an interest rate swap, or to use tranches for the two sides combined. For certain types of transaction the risk is asymmetric between the parties, especially in markets that do not feature central counterparties or clearing mechanisms. In addition to this, many trades with future deliverables have asymmetric profit potential, usually a feature of the fact that the deal value can fall to zero, but can rise without bound. It is also often the case that the addition of a trade one way round can reduce the overall risk between two parties. In both cases, the optional ability to express separate limits for the two sides of a trade is helpful.

The third region 106 permits a firm to specify a base currency to use for both credit limit entry and display, or to request the native currencies for each transaction to be used in entry and display.

The fourth region 108 provides two options for the replenishment of credit tranches. The first option is for all tranches to be replenished by a user defined amount at the beginning of each trading session, which is typically each day, or to require tranches to be replenished manually.

The fifth region 110 of the configuration window of FIG. 6 provides two alternate options for management of the amount of credit left in each tranche of increasing future time intervals. If the second option is selected then a trade of an instrument of a given maturity requires removal of the expended credit from tranches of all time intervals up to and including the maturity of the instrument. Furthermore, a tranche of a longer time interval cannot contain more credit than that of a shorter interval, otherwise the longer interval tranche is trimmed to the same level. Although the result of this is that the credit left in place allows a range of trades to take place, large shorter maturity deals can extinguish the capacity for trading in longer maturities. If the first option is selected then this trimming of longer time interval tranches is not carried out.

A sixth region 112 allows selection of an option in which credit from longer time interval tranches is used when credit in a shorter tranche is exhausted. This consumption from longer tranches occurs before the levelling activity described immediately above.

Figure 7:
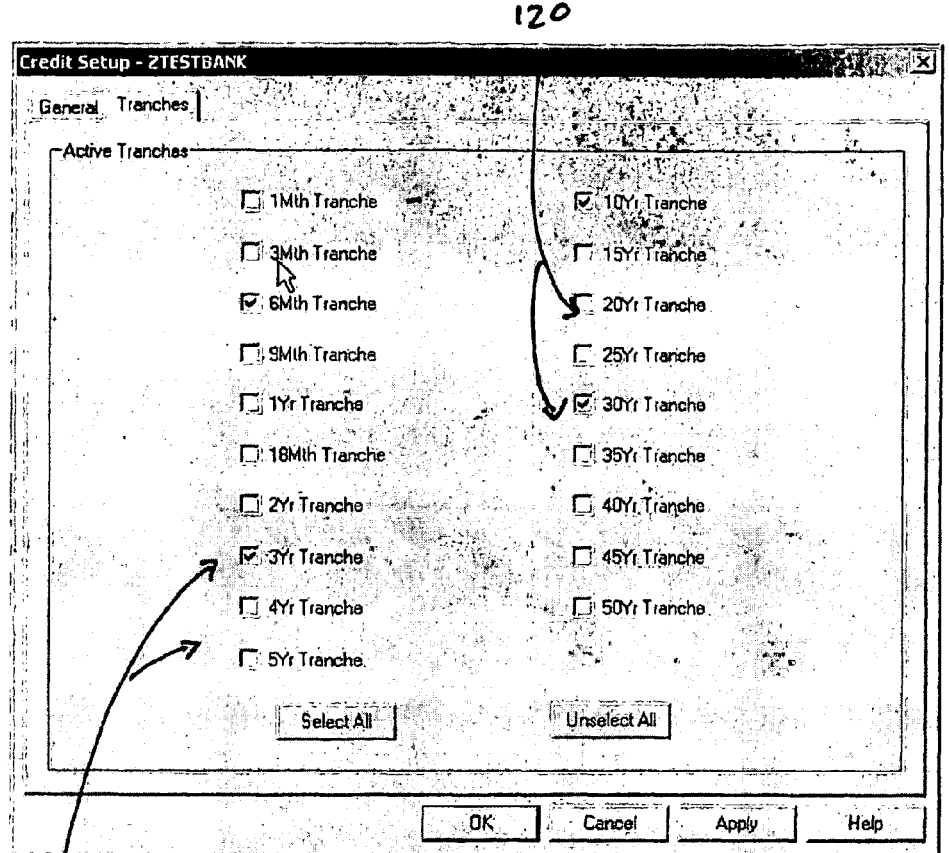
FIG. 7 shows a window permitting a user to select tranches for credit allocation.

FIG. 7 illustrates a window triggered by the "tranches" tab seen in FIG. 6. A set of tick boxes 120 permits a user to choose any combination of the intervals shown, from 1 month through to 50 years, and to thereby set up a group of tranches to contain credit for use in trading instruments having maturities falling within these time intervals. Further windows, not illustrated, provide a facility to define any group of intervals, ranging in maturity over any required ranges such as from one month to fifty years. In the present embodiment this option is provided with a basic one month time interval resolution.

FIG. 8 illustrates a credit matrix window showing some of the credit parameters and remaining credit limit set by a firm in respect of other parties. A facility is provided to filter the credit matrix display according to counterparty and firm. A column 122 on the left gives the trading name or credit centre (counterparty) identification code for each row. A second column 123 identifies the type of credit set by the firm for the counterparty. In simple set ups the credit set by a firm for all counterparties is defined in the same way, with "loan eq" indicating the loan equivalence method. However, in more complex setups different credit calculation schemes can be used for different counterparties.

For each credit centre a check box is provided in the "inherit" column 124 to permit limit to be used, or inherited, by the credit centre. This permits credit to be quickly set up and easily controlled for all or selected credit centres of a firm together, while providing flexibility to define selected credit limits for particular credit centres.

The suspend column 125 permits credit, and hence trading, to be suspended by a firm with a particular counterparty, or if the box is checked for the firm, for all counterparties of that firm.

Towards the right hand side of the table are a series of columns, grouped in triplets of "limit", "used" and "remaining", and labelled with the time interval to which they apply. These columns show the amount of credit available in a particular tranche at the beginning of a trading period, the amount used so far during the trading period, and the amount remaining.

The credit matrix window of FIG. 8 may show a variety of other fields, such as the time of last update of a particular field and the identity of the updating user, and by clicking on particular rows, columns or cells, dialogue boxes are launched which enable update of the various fields and credit parameters, according to the permissions granted by the system to the user.

Figure 9A:
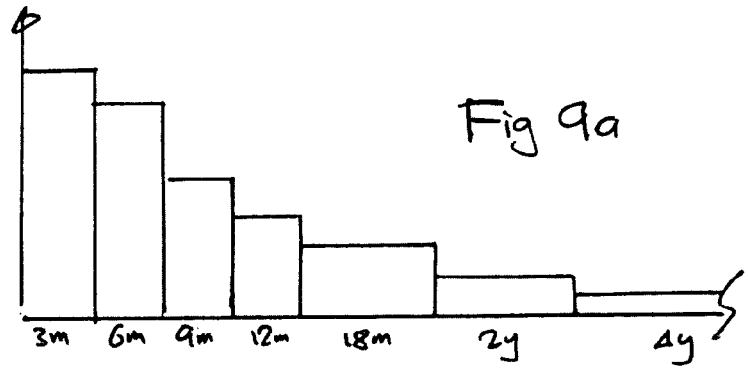
FIGS. 9a to 9d illustrate credit tranche management schemes implemented by the present invention.

FIGS. 9a to 9d illustrate a number of aspects of tranche management implemented by the credit management mechanism 36. In FIG. 9a tranches containing credit for 3 month, 6 month, 9 month, 1 year, 18 month, 2 year and 4 year intervals have been defined. The height of each bar illustrates the remaining credit in each tranche.

Figure 9B:
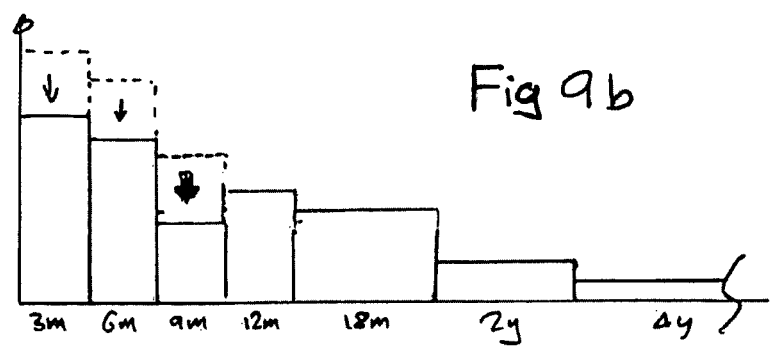

Suppose a large trade of an interest rate swap having a maturity period of 8 months occurs. According to one feature of the system, this trade causes the credit required for the trade to be taken from the 9 month tranche, and also from the shorter term 6 month and 3 month tranches, as illustrated in FIG. 9b.

Figure 9C:
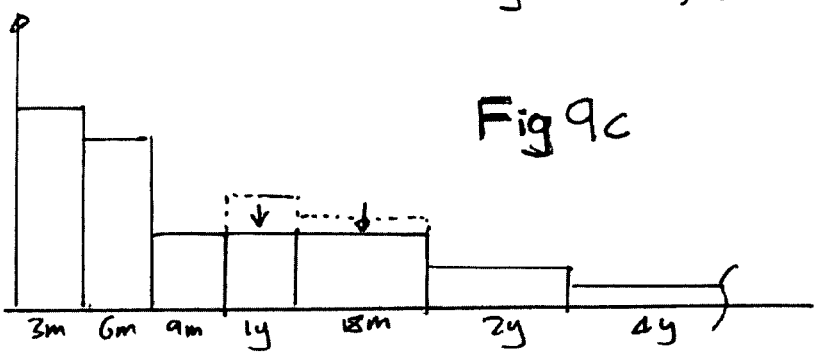

According to another selectable feature of the system, this trade may also cause the amounts of credit remaining in the longer interval tranches for 1 year and 18 months, which are now larger than that remaining in the 9 month tranche, to be levelled to the same as the 9 month tranche, as illustrated in FIG. 9c. In a normal environment a trade of a longer term maturity instrument carries greater risk than a trade in a shorter term maturity instrument, so it is normal for more credit to be provided in shorter interval tranches. Because this levelling-off feature can unduly use up valuable longer term credit, it is provided as a selectable option, as illustrated in FIG. 6.

Figure 9D:
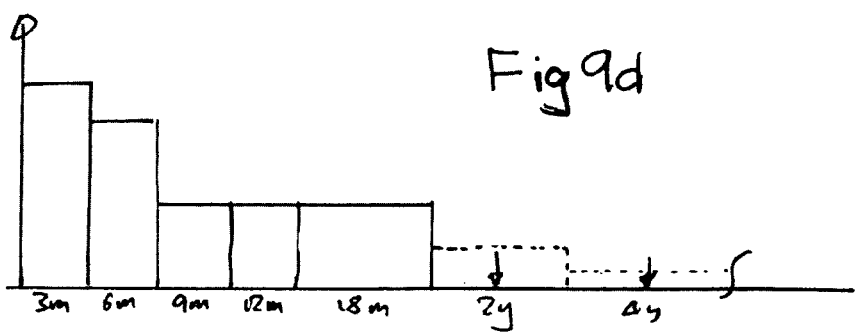

Finally, the system may also be set up, by defining suitable credit parameters, to permit credit from longer interval tranches to be used when credit in the required tranche is exhausted. This is illustrated in FIG. 9d, where credit from the 2 year tranche is insufficient to complete a trade, so credit is borrowed from the 4 year tranche. The starting point of a credit limit check is to cross reference the credit-sensitive event of the longest maturity against the limit tranche whose time span contains that maturity. Limit remaining in longer maturities can therefore be interpreted as a willingness to do riskier trades than limited by shorter tranches.

The management of credit tranches outlined above is illustrated in more detail in the section "Credit Tranche Management" below.

Credit Metrics

Figure 10:
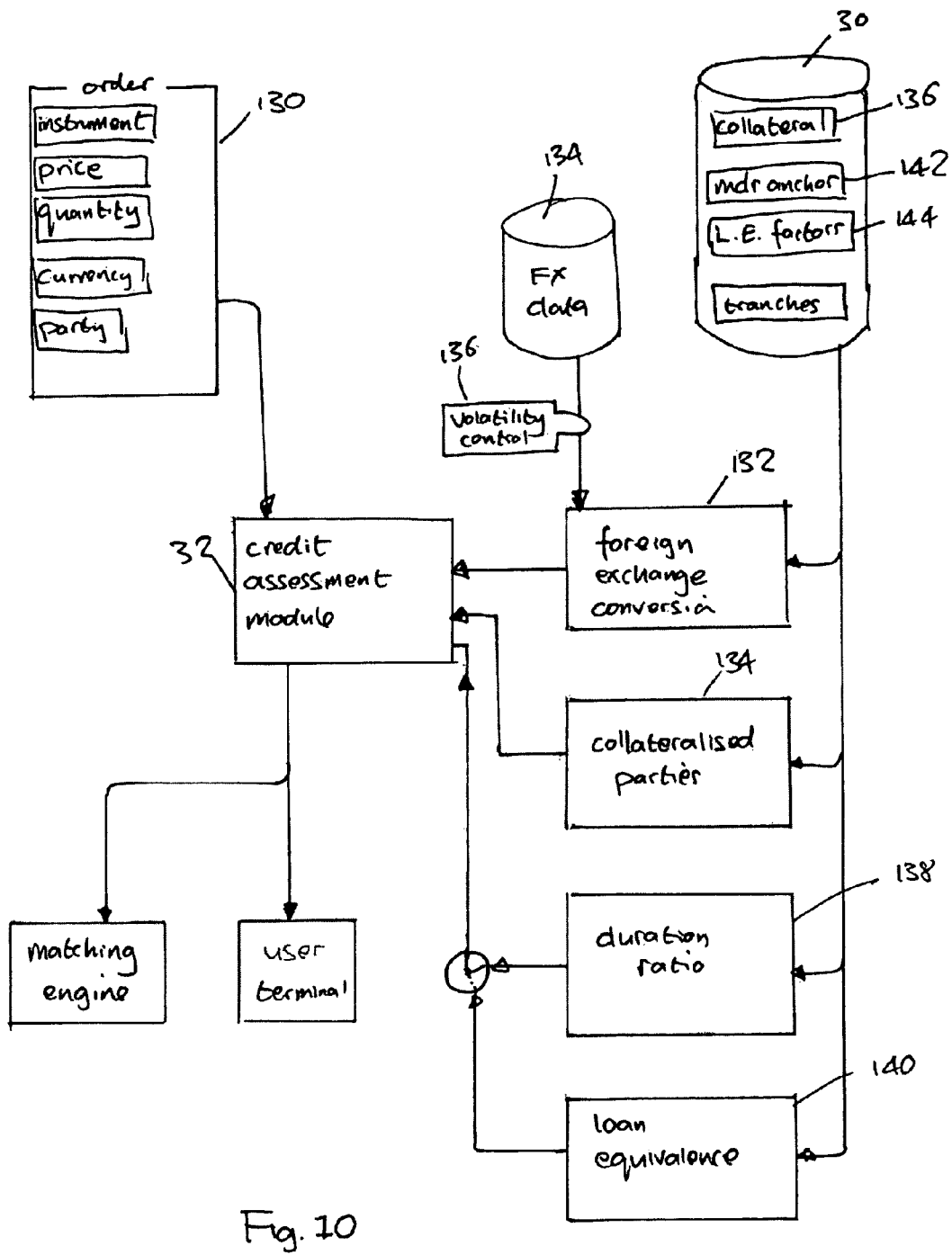
FIG. 10 is a schematic of credit calculation and assessment mechanisms used in the present invention.

FIG. 10 is a schematic diagram illustrating mechanisms by which the credit which will be required to complete a trade on an order 130 is calculated by the credit assessment function 32 of FIG. 2. The order 130 is defined by parameters such as instrument identity, price, quantity, currency of transaction and the party originating the order. The credit parameters for a counterparty which may potentially trade with the order 130 are stored in credit store 30 and are available to the credit assessment function.

Trades in currencies other than that used to express the credit parameters of the counterparty are enabled by a foreign exchange conversion mechanism 132 on the basis of exchange rate data 134, which is updated periodically or at will by market supervisors. The mechanism can take account of foreign exchange volatility by means of a volatility control mechanism 136 which may, for example cause more frequent updates of the exchange rate data. Changes in the exchange rate data may lead to previously unmatched orders becoming automatically matched by the matching engine to form trades. In some embodiments the system may also adjust the amount of credit already used in previous trades on the basis of subsequent foreign exchange rate changes and market volatility.

The assessment of credit can also take account of either party having or not having a collaterised (i.e. post-trade credit risk-reducing) agreement in place. This is effected by the collaterised parties mechanism 134, on the basis of collateral parameters 136. Bi-lateral collateralisation agreements are increasingly common between participants in wholesale financial markets. These agreements allow for certain trades to carry greatly reduced credit risk as the trades are bundled together into a portfolio and the value of that portfolio agreed and exchanged, leaving the credit risk offset by some collateral security. If it is known in advance that such an agreement exists between two potential trading partners then a given amount of credit limit can be used to authorise much larger trade sizes. The credit system models this by providing risk factors, which can be defined separately for any party, for every tradable instrument, that are to be applied respectively to collateralised and non-collateralised counterparties.

Each party can also define every trading counterparty as collateralised or non-collateralised, and this may be reflected in the "line type" column 123 of FIG. 8. The system will spend credit based on the collateralised risk factors, which are generally lower, if the trade is to be executed with a collateralised counterparty. Each party is independently able to have different counterparties defined as collateralised with respect to itself. The magnitude of the reduction in risk gained by trading under a collateralisation agreement is partly quantitative and partly qualitative and is defined differently by different trading organisations, so that there is a need to allow parties to each transaction to express different risk on their side of the trade. This is independent of the ability to express separate credit limits for each side of the trade, which may be a consequence of the nature of the existing collateralised portfolio.

The system can model more than just collateralised and non-collateralised risk factors, allowing, for example, a trading organisation to define a third set of factors to govern trading with fellow domestic entities, a fourth for those fellow members of a certain clearing system, a fifth for merged entities that have not entirely completed the merger process, and more as required.

FIG. 6 illustrates an option to select credit limits and credit limit use in terms of either a duration ratio or a loan equivalence (or other risk factor) calculation. These options are further illustrated by the duration ratio 138 and loan equivalence 140 mechanisms of FIG. 10.

A default anchor instrument may be used for the duration ratio calculation, or a particular anchor instrument 142 may be defined for a party or trading organisation. The duration ratio option is particularly suitable for rapid deployment by non-expert credit limit administrators or experts in a single asset environment. The option effects a style of limit checking based on notional principle equivalence. Credit limits are entered in terms of the notional principle of the anchor instrument that the party is willing to trade with the counterparty in question. Trades in any other instrument consume limit based on the ratio of the modified duration of the traded instrument to that of the anchor. This ratio expresses "delta" risk (the amount made or lost by a change in the valuation rate) in one instrument into delta risk in any other. Alternative risk translation factors, for example based on volatility, could be used. If the anchor and the trade instruments are in different currencies a foreign exchange conversion will also be included. This is an option that can be selected for each party or trading organisation and brings great benefits of speed in explanation, setup and maintenance.

The credit parameters optionally include user defined risk parameters 144 for use by the loan equivalence mechanism 140. These risk factors are illustrated by user interface window 150 shown in FIG. 11. Default risk factors 152 are defined by the system for each instrument 154 and periodically recalculated automatically, but may be overriden by user defined risk factors 156. Risk factors are separately provided or definable for either side of a trade, for example paying (Pc, Pnc) and receiving (Rc, Rnc) sides of an interest rate swap, and for collateralised (Pc, Rc) and non-collateralised (Pnc, Rnc) counterparties. This is a convenient way of implementing the collateral parameters 136 discussed above.

More than four risk factors per instrument can be defined for a party, for example with each group of four factors being applied to a specified category of counterparty. For counterparties which are centrally cleared or guaranteed intra-day clearance into a clearer, a suite of risk factors may be largely or all zero.

A detailed discussion of the credit metric calculations used by the system for interest rate swap instruments are presented in the section "Detailed Credit Calculations" below.

Trading Units

Contracts are written between competent legal entities for buying and selling securities or derivatives, or paying and receiving the sides of "over-the-counter" trades. However, the mere name of the counterpart is not enough for efficient automated settlement, where traders are often deemed by their employers to be acting on behalf of a particular account within the legal entity. The present system allows users to enter orders which are traded using the credit limit given by the counterparty to the legal entity that will appear on the contract but for their trade confirmation to carry particular account details. These account details are subsets of the legal entities as illustrated in FIG. 1, and may thus be described as children. Sub-accounts and sub-sub-accounts are supported, allowing complex post-trade confirmation routing with unique account routing available down to the level of the individual trader, or below to multiple accounts controlled by a single trader.

Figure 12:
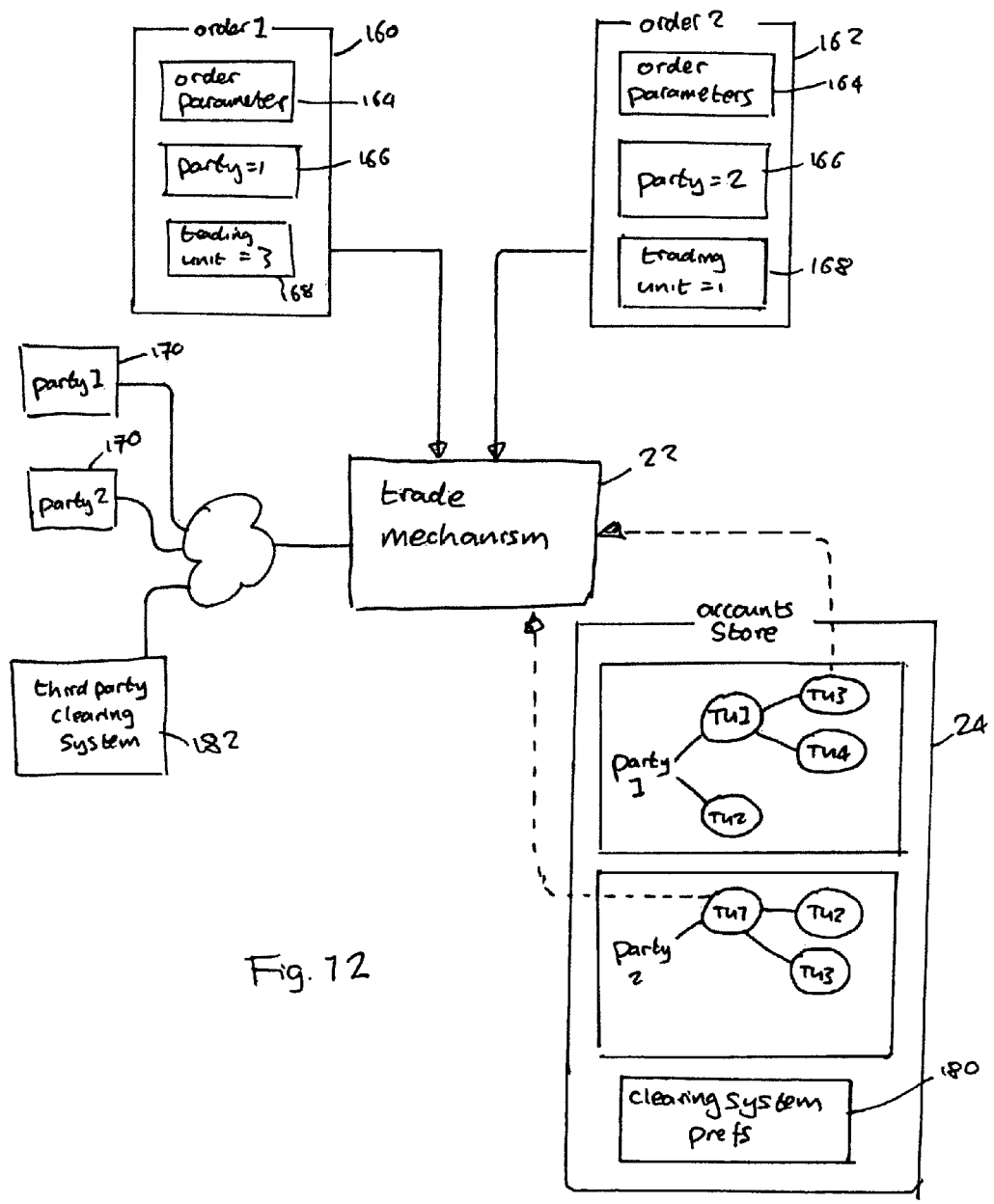
FIG. 12 illustrates aspects of the settlement mechanism used by the present invention.

This is illustrated in FIG. 12 in which trade mechanism 22 is tasked with completing a trade match between a first order 160 and second order 162, each defined by a set of order parameters, and having been submitted on behalf of or having been matched at a particular party 166, but defining a particular trading unit 168 of that party. Network connections between the trade mechanism and computer systems 170 related to or controlled by the parties may be provided to complete the full transaction electronically.

Details of each trading unit are retained within the accounts store 24. For the first party there are four defined trading units, labelled TU1 to TU4, and for the second party there are three units. In each case there is a logical tree relationship branching away from the party concerned.

The defining of trading unit accounts allows a firm to define and quantify a preference to trade with specified counterparties via a clearing system or to trade using a central counterparty. The parameters defining these preferences are stored in clearing system preferences 180, and a remote clearing system computer 182 is connected to the trade mechanism by the network.

In practise, a trader or group of traders can be set up so that, in the event of the traders on both sides of a trade desiring so, the trade is notified to a third party clearing system or novated into the name of a third party. This is distinct to the traders individually wishing to trade in the name of an account at their own institution, as this routing is only chosen if both traders have it as a preference. This not only allows a trader to specify the use of a particular clearing system, for example, but to specify a selection of them and also standard bilateral accounts. Whichever clearing system is at the intersection of both traders' preferences will be utilised, and in the absence of any intersection a standard bilateral trade will occur instead. This in turn allows dynamic selection of clearing mechanism, changing intra-day or at the end of day, based on a trading organisation's preference of clearing price or other metrics.

If the two sides of a trade have more than one proposed clearing house in common then the hierarchy defined by each side is used to select the most preferred common clearing house.

User Desks

Figure 13:
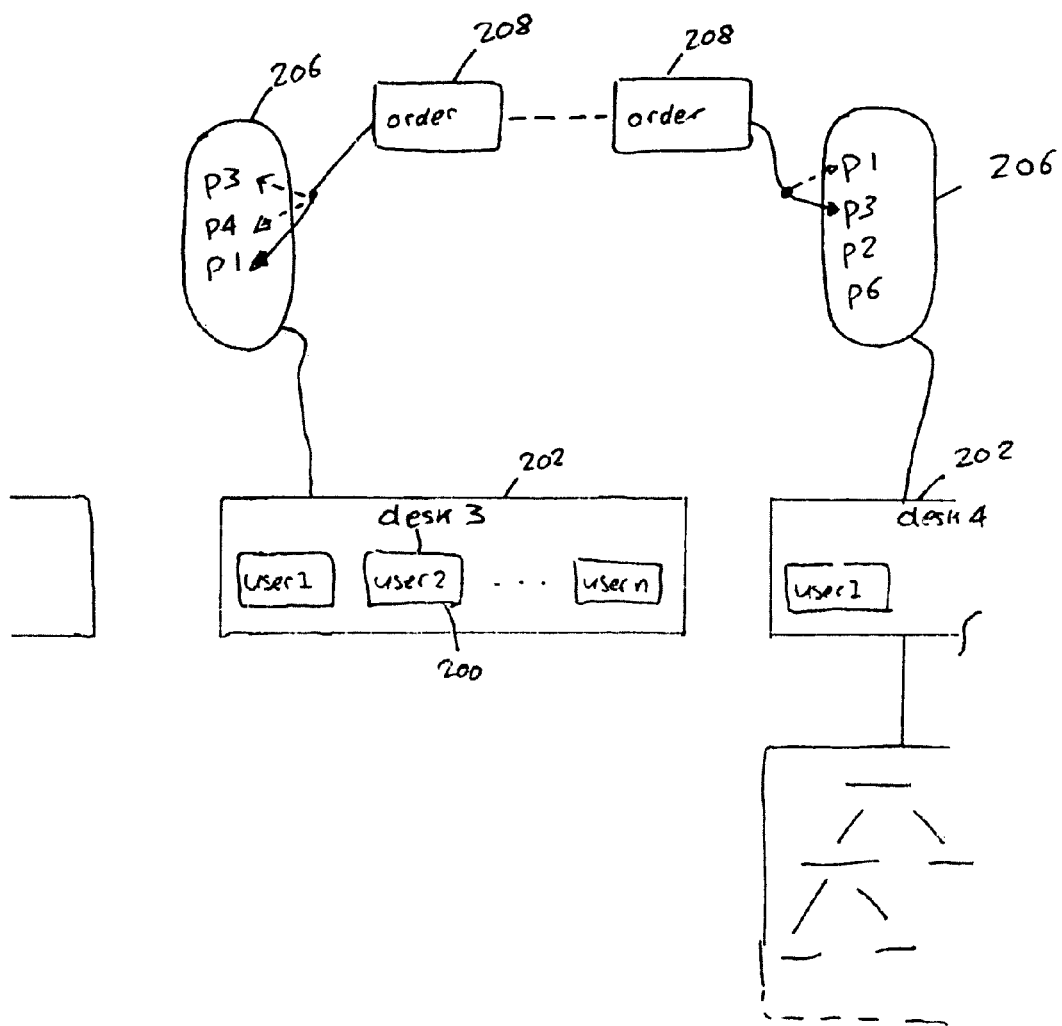
FIG. 13 shows each trader desk having an associated ordered list of credit centres for which traders can submit orders.

In the present system, traders 200 who access the trading facilities via the user terminals 16, are logically grouped into desks 202, as illustrated in FIG. 1, and also in FIG. 13. Each desk may contain one or more traders. Associated with each desk 202 is a hierarchy or list of parties 206 in whose names the traders of that desk may complete trades. The parties of the hierarchy may correspond to credit centres and accounts. Accounts may correspond to third party clearing houses or central counterparties.

The list 206 of parties is in preference order for trading. The matching engine will try to match orders 208 submitted by traders 200 according to the following scheme. A match between any third party clearing house or central counterparty in the lists of the two traders will first be sought. If this fails on credit then a match is sought between other parties in the traders' lists. In both cases, a match is sought in order according to the priorities specified in the lists.

As mentioned above, the matching engine seeks to construct chains of orders which arise from strategy instruments such as spreads which link two underlying instruments, in order to maximise the amount of trade executed. Chains of orders may be formed which contain any number of orders from any number of traders, subject to the cumulative credit limits available, and the same trader or desk may have placed more than one of the orders in the chain. Credit may be taken cumulatively from the same tranche more than once.

The system can be configured to allow or disallow trades combining two orders submitted by traders belonging to the same desk, and is preferably configured to disallow trades combining two orders submitted by the same trader, unless those combinations are between a strategy and a strategy, or between a strategy and an outright.

Credit Painting

Figure 14:
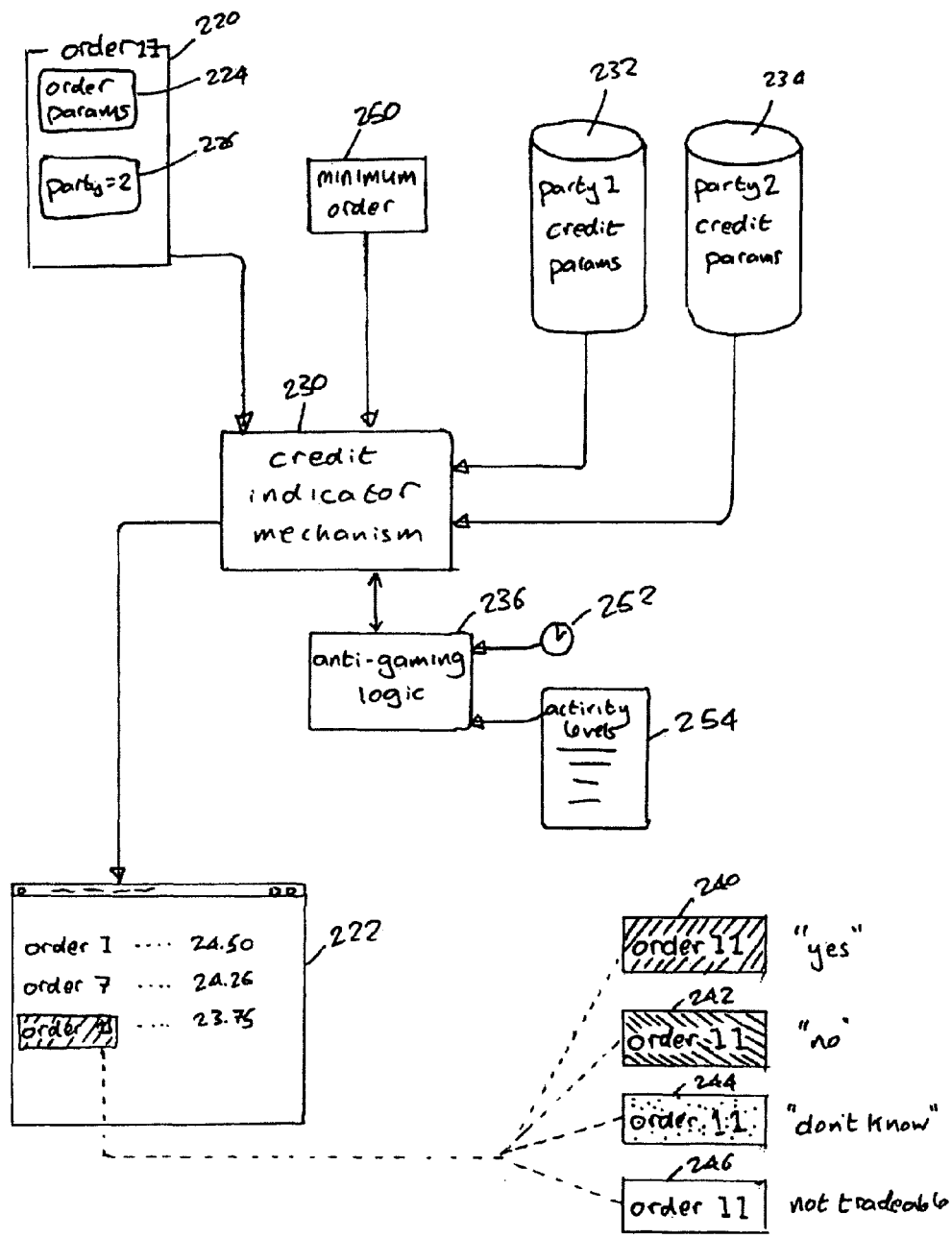
FIG. 14 illustrates a credit painting mechanism used by the present invention.

The described computerised trading system includes mechanisms to inform traders at user terminals 16 about the credit available to complete a trade which could be placed by them, based on particular orders submitted to the system. These mechanisms are illustrated in FIG. 14 in which information regarding an order 220 submitted by a trader for a first firm appears on the user interface 222 of a trader trading for a second firm. Associated with the order are various order parameters 224, such as price, minimum fill quantity and so forth, as well as the identity 226 of the party submitting the order. Some of these parameters, especially price, are visible to the second trader. The identity of the first trader or firm is not visible to second trader.

A credit indicator mechanism 230 transmits to the user interface 222 information regarding the degree to which the second trader can trade on the order 224, which is displayed on the user interface by rendering, or painting information relating to the order using characteristic colours, although symbolic flags and other visual mechanisms could be used. To derive this information the credit indicator mechanism has access to the credit parameters of both the first firm 232 and the second firm 234. An anti-gaming mechanism 236 operates to prevent or make more difficult the derivation of confidential credit information from the credit painting. Because of the design of this system, it is not necessary to restrict or delay delivery of the credit painting information to users.

The information provided to the interface 222 is implemented as a flag which can have a number of different states 236. A "yes" state 240 indicates that sufficient credit is available for the second trader to trade on the order. A "no" state 242 indicates that there is insufficient credit for the trader to trade on the order. A "don't know" 244 state indicates that information regarding whether the trader has sufficient credit to trade on the order is being withheld. The flag may also have an unset state 246 indicating that the order cannot be electronically traded, for example because it is an indicative order or in other ways not a firm expression of a willingness to trade, or because the observing trader does not have permission to trade on this order for other reasons.

The "yes" flag is only set if the potential trade can be of a predefined minimum quantity or size 250, but does not require credit to trade all of the order. The minimum quantity is a system wide constant, but could be set in other ways, or overridden, for example by each user. As discussed above, each trader may be permitted to trade on behalf of any of several credit centres or parties, and may have defined, in association with his desk, a ordered preference list of those parties. The flag is set to the "yes" state if the trader is able to trade with the order at or above the minimum quantity in the name of any of these parties.

The "yes" flag may alternatively or additionally be set according to whether or not there is enough credit available to complete a trade on the order 220 and to satisfy any minimum fill quantity, or an all-or-nothing condition associated with the order.

The system permits selective control over the delivery of credit painting information based on groups of users such as traders, trading desks, trading organisations or their brokers. For example, the flag can be forced to "don't know" status for various groups and types of users.

The "don't know" flag is used to limit the extent to which users can glean, from the credit painting, information about credit limits set by other parties, and about the identity of a party that submitted an order. For example, a firm could sequentially reduce credit limits to potential counterparties to zero, and determine the party which submitted an order by seeing which reduction changed the status of an order from "yes" to "no". Similarly, if a firm sets positive credit limits for only a limited set of parties, then the party submitting an order which receives a "yes" painting must belong to that set.

To preserve anonymity, the anti-gaming mechanism ensures that all flags are set to "don't know" for all users of a firm for a set time interval 252 following amendment to the credit parameters of that firm. An appropriate time interval will depend on the market in question. In a preferred embodiment, this time interval may be approximately two minutes, long enough for sufficient price changes to occur in the market in question to make the anti-gaming measure effective. The time interval may be set at different sizes for different firms, for example by market supervisors seeking to penalise gaming activity.

Each firm must set up sufficient credit to execute trades with at least a minimum number of counterparties, so that any "yes" flag cannot be correlated to a small group of counterparties. To implement this scheme, each credit centre or firm is assigned an activity level 254, and credit limit must be allocated to at least the minimum number of counterparties or firms that have an activity level above a system wide threshold. Otherwise order flags are set to "don't know", by tranche.

The number of counterparties to a firm that are not given sufficient credit to effect trades must also be either zero or above a minimum threshold, otherwise the order flags are set to "don't know".

User Roles and Permissions

The system supports, among others, the following user roles:
Trader Credit Officer
Permissioned to:
Trade by product;
Enter and amend own orders, and share orders on his desk;
View orders entered by traders in his firm;
view orders entered on his behalf by brokers, and can also withdraw these orders;
View orders entered by brokers on behalf of traders in his firm;
View trades in his firm, and can accept own trades for processing;
Can enter and amend credit limits for his firm.
Credit Officer
Permissioned to:
View orders entered by traders, or on behalf of traders in his firm;
View trades in his firm;
Can enter and amend credit limits for his firm.
Supervisors (System Operator Staff Only)
Are also market administrators and can view and control all aspects of trading system. This includes but is not limited to withdrawing orders, suspending users, firms, instruments and products and boards.
Other roles include Trader, Trader Desk Manager, Trade Manager, Trader Desk Enquiry, Trade Enquiry and Broker.

Credit Tranche Management

The tranche system allows a firm to give credit limit to counterparties in sub-sections of the yield curve. It does not have to be used; selecting a single tranche covering the whole maturity range in which a firm intends to trade simplifies the credit system towards a yes/no model. Credit limit within tranches is either zero, a positive amount, or unlimited, so using one tranche with unlimited or zero values will produce the most basic configuration possible. A normal, tranched, configuration requires more updating but gives more control over trading.

Reduction of credit limit takes place in all tranches up to and including the tranche that contains the maturity of the instrument traded. For example, a firm with a two-tranche set-up may wish to establish enough credit to trade 1000 units of a one-year swap. Separately, the firm might wish to be able to trade 1000 units of a two year swap.

Sufficient credit for both trades may be represented as a stepped graph with a total of 2000 units in the first year and 1000 units in the second. If the limit expenditure routine subtracts the full amount of credit available to do each swap then there will be no limit left after doing the 1 yr and 2 yr deals.

One important point to note about this is that increasing the number of tranches (for example, inserting a 6 month tranche into the set-up above) does not multiply the amount of credit being lodged, in terms of how much trading that limit allows. A better way to measure the total credit lodged with the system would be to take the amount in the furthest tranche, add to that the difference to the next tranche, and so on to the first tranche.

The expenditure method outlined above could, however, lead to a slightly absurd situation in which, rather than trading 1000 1 yr and 1000 2 yr, a firm instead trades two orders of 1000 units with a one year maturity. One might then see a marooned block of credit covering year two. While a forward-starting trade might be able to be approved, a shorter trade such as another 1 year trade might not. To avoid this the system can be set up to use the Adjust All Tranches (AAT) methodology in the Credit Setup window illustrated in FIG. 6. The marooned block would simply be deleted by the system, following a rule not to allow any tranche to have a higher limit than the earlier tranche next to it. This solution can be wasteful with lodged credit, but preserves the flat or decreasing-stepped shape of limits along the tranches.

As an alternative it is possible to turn off this rule, by selecting Adjust Tranches Inward (ATI) in the same window. This can increase the number of trades done for a given amount of lodged credit, but can lead to eccentric limit profiles.

There is an important exception to these rules that applies when a tranche has run out of credit. This is detailed below.

When there is insufficient credit in the tranche of the maturity of an instrument to be traded the system can optionally consume credit in tranches further away down the curve. This might unfold as follows:

AAT

| 1. (Example of credit set up with AAT and four tranches) | | | |
| --- | --- | --- | --- |
| >0 to 3 Mth Limit | >3 to 6 Mth Limit | >6 Mth to 1 Yr Limit | >1 Yr to 2 Yr Limit |
| 20 | 20 | 20 | 15 |

If a deal is done that attracts a credit spend of 10 with a maturity of 4 months (for example, a deal of pay fixed for 5bn EUROIS 4M where this bank has defined a Pay loan equivalence factor of 0.2% for that instrument) the remaining limit will look like this:

| 2. | | | |
|---|---|---|---|
| >0 to 3 Mth Remaining | >3 to 6 Mth Remaining | >6 Mth to 1 Yr Remaining | >1 Yr to 2 Yr Remaining |
| 10 | 10 | 10 | 10 |

The first two tranches have been reduced by the credit expenditure, and the last two have been levelled down as a consequence. One more trade of 5bn in this instrument will leave no credit at all, and no more trading will occur.

However, a larger second trade of 7bn would also be allowed to happen, as the credit spend of 14 will be taken out of the longer limits before they are trimmed down to zero. Stage one of the trade of 7bn is to subtract 14 out of the >3 to 6Mth tranche, which it does not have.

Instead, subtracting 10 and then 4 out of the next tranche is allowed:

| 3. | | | |
|---|---|---|---|
| >0 to 3 Mth Remaining | >3 to 6 Mth Remaining | >6 Mth to 1 Yr Remaining | >1 Yr to 2 Yr Remaining |
| 10 | 0 | 6 | 10 |

Next, the same spend is removed from all earlier trenches. In this case, there is only 10 available in the >0 to 3Mth tranche, but the process does not require extra credit to be taken from longer tranches to cover this shortfall. This in turn allows a user to relate the credit remaining in a tranche to a trade size without referring to any other limit information. This behaviour is deliberately aggressive, but is consistent with the aim of reducing the amount of credit that must be lodged to allow a given volume of trades:

| 4. | | | |
|---|---|---|---|
| >0 to 3 Mth Remaining | >3 to 6 Mth Remaining | >6 Mth to 1 Yr Remaining | >1 Yr to 2 Yr Remaining |
| 0 | 0 | 6 | 10 |

Finally, the longer tranches are rounded down so that they do not have more credit than their immediately earlier tranche:

| 5. | | | |
|---|---|---|---|
| >0 to 3 Mth Remaining | >3 to 6 Mth Remaining | >6 Mth to 1 Yr Remaining | >1 Yr to 2 Yr Remaining |
| 0 | 0 | 0 | 0 |

It would be possible to do a much larger trade than the combined size of the 5bn and 7bn. Indeed, a single trade of 27.5bn would be possible—the credit spend of 55 would be taken out of the second, third and fourth tranches, and the first tranche reduced to zero. It is a property of the AAT method that the order that trades occur in is important, but the maximum tradable amount is not affected by this.

Limit can have an unorthodox distribution across the curve, if a bank chooses the ATI option in the Credit Setup screen of FIG. 6. As mentioned earlier in this document, this option exists to allow the system to maximise the number of trades generated from a given amount of credit, which is achieved by not levelling down longer tranches when they have more limit than shorter tranches. Starting from a normal situation such as this:

| 6. | | | |
|---|---|---|---|
| >0 to 3 Mth Limit | >3 to 6 Mth Limit | >6 Mth to 1 Yr Limit | >1 Yr to 2 Yr Limit |
| 20 | 20 | 20 | 15 |

If a deal is done that attracts a credit spend of 10 with a maturity of 4 months (for example, the same deal of pay fixed for 5bn EUROIS 4M with a Pay loan equiv. factor of 0.2% used in the example above) the remaining limit will look like this:

| 7. | | | |
|---|---|---|---|
| >0 to 3 Mth Remaining | >3 to 6 Mth Remaining | >6 Mth to 1 Yr Remaining | >1 Yr to 2 Yr Remaining |
| 10 | 10 | 20 | 15 |

If another deal in the same instrument takes place but for 7bn, with a spend of 14, then the system will empty the 3 to 6Mth tranche of the 10 present, and take the balance from the next tranche up. The 0 to 3Mth tranche does not have 14 either, but in the case of shorter tranches the system will simply reduce them to zero:

| 8. | | | |
|---|---|---|---|
| >0 to 3 Mth Remaining | >3 to 6 Mth Remaining | >6 Mth to 1 Yr Remaining | >1 Yr to 2 Yr Remaining |
| 0 | 0 | 16 | 15 |

The same trade could be performed again:

| 9. | | | |
|---|---|---|---|
| >0 to 3 Mth Remaining | >3 to 6 Mth Remaining | >6 Mth to 1 Yr Remaining | >1 Yr to 2 Yr Remaining |
| 0 | 0 | 2 | 15 |

And again . . .

| 10. | | | |
|---|---|---|---|
| >0 to 3 Mth Remaining | >3 to 6 Mth Remaining | >6 Mth to 1 Yr Remaining | >1 Yr to 2 Yr Remaining |
| 0 | 0 | 0 | 3 |

It can be seen that a total of 26bn of this instrument has been traded. If a trader tried to do a single deal of 26bn, with the original limits, this would also be allowed by the credit system, and would leave remaining limits identical to those in table 10 above. Indeed, a total of 27.5bn can be traded. However, smaller trades that add up to this total will be allowed to take place. This is in contrast to the behaviour under the AAT configuration, where limits can be extinguished by these smaller trades.

Detailed Credit Calculations

A. Concepts

The credit exposure of an interest rate swap is the loss that may occur if the counterparty were to default. This is usually defined as the maximum of the present values of losses that may occur.

Losses can be expected losses or maximum losses at a certain confidence level. Accordingly, two types of credit exposure can be defined:

Expected exposure is option value based or, in other words, insurance-type credit exposure. It is the present value of the maximum expected or averaged future losses of a swap, which is the maximum amount required to insure the swap.

Maximum exposure is scenario based credit exposure. For a given confidence level, it is the maximum loss of a swap if the counterparty were to default.

Expected exposure is the arbitrage-free price of the future loss of a position. One of the problems of this definition is that such a credit exposure does not tell you how wrong can things go if the counterparty defaults. Maximum exposure overcomes this problem. It tells you what is the worse case scenario with a certain confidence when the counterparty defaults. In the present system the scenario-based approach is used.

Research and experience show that, for a swap with a long maturity, as time increases the loss of the swap over time increases and then decreases. It peaks at a certain point between the middle of the swap's effective date and the maturity. Hence to find the credit exposure of a swap it is not necessary to deal with all future time points. A few properly chosen time points will be able to capture approximately the peak of future losses. In the present system the yearly cycle dates starting from the settlement date until the effective date of the swap are used, with the swap's effective date and certain coupon payment dates.

At a non-coupon payment date the maximum loss of a swap is the cost to replace the swap. At a coupon payment date the maximum loss of a swap is the sum of the replacement cost and the loss of the netted cash flow, which is the difference of the interest amount to be received and the amount to be paid out.

B. Formulae for Calculating Credit Exposure

Consider first a swap, which starts today and whose fixed leg and floating leg have the same payment frequency. Suppose today's time is $t_0=0$ and the payment time points are (in years) $t_0 < t_1 < t_2 < \ldots < t_N$. Then the cost to replace the swap at $t_1$ is $$P \times \Sigma_{j=i+1}^{N} (\text{Max}(H \times (R-R_0), 0) \times T_j \times DF(t_j)) \quad (A)$$

Where P is the swap's notional, H=1 for a payer (paying fixed) swap and −1 for a receiver swap, $R_0$ is the contract swap rate, R is the par swap rate of a swap that starts at $t_1$ and matures at $t_N$ and that has the same payment structure as the original swap, $T_j = t_j - t_{j-1}$ is the time length of period j, $DF(t_j)$ is the discount factor at $t_j$. The loss of the swap's coupon payment at $t_i$ in the event of default is $$P \times \text{Max}(H \times (r-R_0), 0) \times T_i \quad (B)$$

Where r is the swap's floating rate applied to the period i−1. For a plain vanilla swap with no compounding r is the $T_{i-1}$ year reset (e.g. LIBOR) rate at time $t_{i-1}$. For an OIS r will be the daily compounded overnight index rate in the period i−1.

When the two legs have different payment frequencies see Part 2.

C. Interest Rate Model Selection

Given the uncertainty of future interest rates, a model is required for swap and reset rates, and a calculation method to find the credit exposure of an interest rate swap. Many interest rate models (for example Black's lognormal model, Hull-White's mean reversion model and BGM model and so on) are in use in both academia and industry. Among them the lognormal model and the Hull-White model are the most popular. Each has its own features. The advantages of the lognormal model are that it has been used in cap/floor and swaption pricing for a long time and it does not violate the observation that interest rates are nonnegative. Moreover, since there are quoted volatility data for caps/floors and swaptions, calibration for lognormal models is simple and accurate. Its disadvantage is that the lognormal model does not model mean reversion phenomenon. The Hull-White mean reversion model overcomes this problem. However, there are no adequate market quotes based on such a model, and this causes calibration problem. Moreover, this model can give negative interest rates. In the present system the lognormal model is used for both swap rates and reset rates.

D. Calculation of Confidence Intervals

1. Interest Rate with No Compounding.

Let $X_t$, observed at time t, be a forward interest rate, i.e., a forward swap rate or a forward reset rate applying to certain future time period after time t. Assuming the lognormal model, under risk neutral probability we can express $X_t$ as $$X_t = X_0 * \exp(\sigma \times W_t - 0.5 \times \sigma^2 \times t),$$

where W is a standard Brownian motion and σ is the volatility of $X_t$. Note that $X_0$ is the forward rate applying to the same future time period. It is a known constant. It is easy to check that with 95% of confidence $X_t$ will not exceed $$X_0 * \exp(1.65 \times \sigma \times \sqrt{t} - 0.5 \times \sigma^2 t)$$

and also with 95% of confidence $X_t$ will not go below $$X_0 * \exp(-1.65 \times \sigma \times \sqrt{t} - 0.5 \times \sigma^2 t)$$

2. Compounded Interest Rates

The calculation of confidence intervals of a compounded interest is a little more complicated. Let $u_0 < u_1 < \ldots < u_K$ be the compounding periods and $X_1$ the reset rate, observed at time $u_i$, for the time period $(u_{i-1}, u_i)$ and X the compounded rate of $X_i$'s over the time period $(u_0, u_K)$. Then $$X = [(1+X_1 \times (u_1-u_0)) \times (1+X_2(u_2-u_1)) \ldots (1+X_K \times (u_K-u_{K-1}))-1]/(u_K-u_0)$$

Since interest rates are small, we have approximately $$X \cong [X_1 \times (u_1-u_0) + X_2 \times (u_2-u_1) + \ldots + X_K \times (u_K-u_{K-1})]/u_K-u_0).$$

If the time periods are equally spaced, we have $$X \cong (X_1 + X_2 + \ldots + X_K)/K.$$

In this case to calculate the confidence bounds of X we can calculate the confidence bounds of each $X_i$ and then simply average them.

E. Credit Exposure for a Swap with the Same Payment Frequency

First consider a swap whose fixed leg and floating leg have the same payment frequency and the reset rate of the floating leg does not compound. Following the notations above the credit exposure of a swap can be calculated according to the following steps.

Step 1. Determine the time points at which credit exposures are to be calculated. Let $0 < t_1 < t_2 < \ldots < t_N$ be the time points selected.

Step 2. For each time point $t_i$ calculate the projected maximum (minimum) swap rate at 95% confidence for a swap that starts at this time point and expires at $t_N$ and have the same swap structure as the original swap:

$$R_1 = R_{i,0} \times \exp(H * 1.65 \times \sigma \times \sqrt{t_i} - 0.5 \times \sigma^2 \times t_i),$$

where $R_{i,0}$ is the forward swap rate for a swap that starts at $t_i$ and matures at $t_N$ and that has the same payment structure as the original swap, and σ is the rate volatility.

Step 3: For each i=1, 2, ..., N calculate the maximum cost, at 95% confidence, of replacing the swap at $t_i$ $$P \times \Sigma_{j=i+1}^{N}[\text{Max}(H \times (R_i - R_{i,0}), 0) \times (t_j - t_{j-1}) \times DF(t_{j+1})].$$

Step 4: For i=1, 2, ..., N if $t_i$ is a coupon payment time point, calculate the maximum cash flow loss, at 95% confidence, at time $t_i$:

$$P \times \text{Max}(H \times (r_1 - R_{i,0}), 0) \times (t_1 - t_{i-1}) \times DF(t_i)$$

where $$r_i = r_{i,0}(t) \times \exp(H \times 1.65 \times \sigma \times \sqrt{t_{i-1}} - 0.5 \times \sigma^2 \times t_{i-1}).$$

Step 5. Add the values calculated from step 3 and step 4 together to get the present value of the projected maximum loss at each time point $t_1$. Then take their maximum over all the selected time points to get the credit exposure of the swap.

F. Credit Exposure for a General Swap

For a general swap the floating rate resets more frequently and compounds. The coupon payment frequencies of the two legs may be different. For such swaps their credit exposures are a little different from those considered above. For a swap with few coupon periods such a difference may be very significant and even dominant. Such differences cannot be ignored.

1. The reset rate of the floating leg compounds.

This can be handled easily by replacing the value of $r_i$ in step 4 by the projected compounded reset rate. The calculation for a projected compounded reset rate has been discussed in Section A.

2. The fixed leg and the floating leg have different payment frequencies.

When the two legs of a swap have different payment frequencies, credit exposure is slightly different from a swap whose two legs have the same payment frequency. The difference is the result of the netting effect of cash flows. For example, if the fixed leg has a yearly coupon payment frequency and the floating leg has a semi-annual frequency, then at the semi-annual payment date, the payer of the fixed leg is fully exposed to the cash flow amount from the floating leg. While at the annual payment date the receiver of the fixed leg has an exposure of $$P \times \text{Max}(R_0 - R \times 0.5, 0),$$

where $R_0$ is the fixed coupon rate and R is the reset rate for the second period of the year.

For this case modifications are needed in step 1 and step 3. For step 1 on the coupon dates one could use all the coupon payment dates of the two legs or only use the coupon dates of one leg. It is a little cumbersome to use all the coupon payment dates. In the present system the coupon dates of the leg that pays less frequently are used. For step 3 all the cash flow exposures between any two coupon payment dates selected in step 1 are as indicated above.

G. Calculation of the Default Analytics

1. Discount Factor Curves

Discount factor curves are built using deposit and swap rates provided by the trading system. The curve building method used is the standard bootstrap method.

2. Interest Rate Volatility Curves

Implied volatilities from quoted swaption data provided by the trading system are used to build interest rate volatility curves. For example, the swap rate volatility of a Euro swap that starts 5 years from now and has a 10-year time to maturity is the implied volatility from the quote of a swaption on such a swap. If this swaption is not available, one with the closest structure will be used.

3. Benchmark Swap Rates

A benchmark swap rate that which gives the swap a fair value of 0. Benchmark swap rates in the trading system are calculated from discount factor curves built as above.

4. Duration Factors

The Hedge Factor in the trading system is defined as the modified duration of the swap, which is the difference of the duration of the swap's fixed leg and that of the floating leg. In more detail $$\text{Duration Factor} = D_{fix} - D_{float},$$

where $D_{fix}$ the duration of the swap's fixed leg with exchange of principal at maturity and $D_{float}$ is the time (in years) to the swap's effective date. For a spot swap $D_{float}=0$.

Duration factors of swaps can be used for hedging purpose. For example, suppose a trader owns a swap, swap A, that has a duration factor of 5 and a notional of 500,000. If the trader wants to hedge his position with another swap, swap B, that has a duration of 10, he/she can short swap B with a notional of $$\frac{\text{Duration}(A) \times \text{notiona}(A)}{\text{Duration}(B)} = \frac{5 \times 500,000}{10} = 250,000.$$

Now the trader's portfolio, a long position of swap A and a short position of swap B, is delta neutral.

5. Collateralised and Non-Collateralised Loan Equivalent Credit Exposures

In the present system the loan equivalent credit exposure of a swap is defined as the maximum present value of maximum future losses at 95% confidence, per 1 notional, of the swap in the event that the counterparty defaults. For a payer swap, i.e., a swap that pays fixed and receives floating, the higher the interest rate rises, the higher its exposure to the counterparty. The opposite is true for a receiver swap. Hence to determine the credit exposure the first step is to determine the level of the swap rate.

Under the assumption that a swap rate has lognormal distribution, at 95% confidence level in t years it will not exceed $$R_0 \times \exp(1.65 \times \sigma \times \sqrt{t} - 0.5 \times \sigma^2 t)$$

and at 95% confidence level in 1 years it will not go below $$R_0 \times \exp(-1.65 \times \sigma \times \sqrt{t} - 0.5 \times \sigma^2 t)$$

where $R_0$ is the day's benchmark rate of the swap and σ is the annualised volatility of the swap rate. Using these formulae and the swap structure we can easily calculate credit exposures.

H. Collateralised Loan Equivalent Credit Exposures

The collateralised loan equivalent credit exposure of a swap is the credit exposure in one day. In more detail it is the maximum loss of the swap in one day at 95% confidence level, in the case that the counterparty defaults. The loss is the replacement cost of the swap.

Consider a swap that starts today and has a time to maturity of 5 years. Suppose its fixed leg has an annual coupon frequency and accrual method of actual/360. Let t=0 be the present time and a spot discount factor curve given as follows:

| 0 | 1 | 2 | 3 | 4 | 5 |
|---|---|---|---|---|---|
| 1 | 0.95 | 0.9 | 0.85 | 0.8 | 0.75 |

We calculate the benchmark swap rate from the curve as 0.05974. Suppose further the annualised volatility of the swap rate is 25%. For one day $t=1/360=0.002778$. It follows from the formulae given above that the 95% confidence upper and lower bounds for the swap rate in one day are, $$0.05974 \times \exp(1.65 \times 0.25 \times 0.5 \times 0.25 \times \sqrt{t} - 0.5 \times 0.25^2 \times t) = 0.06105$$

and $$0.05974 \times \exp(-1.65 \times 0.25 \times \sqrt{t} - 0.5 \times 0.25^2 \times t) = 0.05845$$

respectively. Then for a payer swap the collateralised loan equivalent credit exposure is $$(0.06105 - 0.05974) \times (0.95 + 0.9 + 0.85 + 0.8 + 0.75) = 0.5558\%$$

and for a receiver swap $$(0.05974 - 0.05845) \times (0.95 + 0.9 + 0.85 + 0.8 + 0.75) = 0.5482\%$$

I. Non-Collateralised Loan Equivalent Credit Exposure

Calculating the non-collateralised loan equivalent credit exposure of a swap is more complicated than the collateralised exposure. The holder of a swap is exposed to the counterparty at all future times until the maturity of the swap. Losses can consist of the cost of replacing the swap and the loss of accrued interests as well.

Consider the above example. In addition, suppose the floating leg resets and pays annually. It is unnecessary to consider the swap's credit exposure scenarios at all future time points. A small set of points will be able to capture approximately the peak of the credit exposure curve of a swap. We use the effective date and the coupon payment dates for these points. At $t=1$, the effective time, the maximum loss from default is the cost of replacing the swap. At a coupon payment time point, except for the maturity, the maximum losses are the sum of the cost to replace the swap and the loss of accrued interest. At the maturity the maximum loss is only the accrued interest.

First we need the benchmark swap rates for the swaps that start at years 1, 2, 3 and 4, mature at year 5 and have the same coupon payment frequency as the swap in the example. Using the discount factor curve above we can calculate these swap rates. The results are given in the following table:

| 1 | 2 | 3 | 4 |
|---|---|---|---|
| 0.05974 | 0.06159 | 0.06355 | 0.06557 |

We also need to predict the maximum changes from today at 95% confidence of these swap rates at the effective dates of the swaps. They can be calculated from the benchmark rates in the above table and the formulae above. The following table shows the 95%-confidence upper and lower bounds for these swap rates.

| | 1 | 2 | 3 | 4 |
|---|---|---|---|---|
| upper | 0.08746 | 0.10369 | 0.11822 | 0.13205 |
| lower | 0.03833 | 0.03229 | 0.02832 | 0.02536 |

For $t=1$ the present value of the cost of replacing the swap is the present value of the sum of the losses of the swap's cash flows at time $t=2,3$, and 4, which is $$(0.08746 - 0.05974) \times (0.95 + 0.9 + 0.85 + 0.8 + 0.75) = 11.7833\%$$

Similarly, for $t=2$ the present value of the cost of replacing the swap is $$(0.010369 - 0.05974) \times (0.9 + 0.85 + 0.8 + 0.75) = 14.5031\%$$

Similar calculations give the present values of costs of replacing the swap at other time points and for costs of replacing a receiver swap. The results are summarized as follows

| A. Cost of replacement | | | | |
|---|---|---|---|---|
| | 1 | 2 | 3 | 3 |
| payer | 0.11783 | 0.14503 | 0.14035 | 0.11208 |
| receiver | 0.09099 | 0.09059 | 0.07540 | 0.05329 |

Now we calculate the preset values of maximum accrued interest losses at the coupon payment time points. Losses of accrued interests are subject to uncertainty of the floating leg reset rate. Hence we need to forecast the reset rate at coupon payment time points.

The forward rates for the coupon periods can be calculated as follows.

| 1 | 2 | 3 | 4 |
|---|---|---|---|
| 0.05477 | 0.05799 | 0.06162 | 0.06554 |

The calculation for the 95%-confidence bounds for these forward rates can be calculated as above. The results are given in the following table.

| | 1 | 2 | 3 | 4 |
|---|---|---|---|---|
| upper | 0.08020 | 0.09763 | 0.11463 | 0.13198 |
| lower | 0.03514 | 0.03040 | 0.02746 | 0.02535 |

For a payer swap for $t=1$ the present value of maximum loss of the accrued interest at 95% confidence is $$(0.08020 - 0.05477) \times 0.90 = 0.02288.$$

Present values of maximum accrued interest losses can be calculated in a same way at $t=2,3$, 4 and for a receiver swap. The results are summarized as follows.

| B. Lose of accrued interest | | | | |
|---|---|---|---|---|
| | 2 | 3 | 4 | 5 |
| payer | 0.02288 | 0.03369 | 0.04241 | 0.04983 |
| receiver | 0.01767 | 0.02345 | 0.02733 | 0.03014 |

Combining Table A and B we get the present values of maximum losses of the swap at the swap's effective date and its coupon payment dates as follows:

| Total PV of max losses at future time points | | | | | |
|---|---|---|---|---|---|
| | 1 | 2 | 3 | 4 | 5 |
| Payer | 0.11783 | 0.16791 | 0.17404 | 0.15449 | 0.04983 |
| Receiver | 0.09099 | 0.10826 | 0.09886 | 0.08061 | 0.03014 |

Taking the maximum of the values in each row to get the credit exposures for a payer swap produces 17.40%, and for receiver swap 10.83%.

This is a simple representative example. Some swaps have different coupon frequencies for the two legs and some swaps have floating legs that reset more frequently than their fixed coupon payments. Calculation for credit exposures of such swaps requires more careful handling, as discussed in the previous section.

Although a particular detailed embodiment with some particular variations and alternatives has been described, this should not be taken to limit the invention which may be implemented in a range of other ways. The scope of the invention is rather to be understood from the spirit and scope of the following claims and corresponding equivalents.

The invention claimed is:

1. A computerized trading system for use in trading financial instruments between parties, comprising:
   an accounts store that stores details of multiple trading accounts relating to at least some of the parties, the multiple trading accounts for each party defining respective multiple trading preferences for the party and being defined at multiple levels of a tree of trading accounts;
   an order store that records order parameters defining orders submitted on behalf of the parties for trading financial instruments;
   a credit store that records a set of credit parameters maintained for each of the multiple trading accounts for each party, each set of credit parameters defining limits of credit for the trading account to determine the credit worthiness of trades between the party and other parties;
   a credit management mechanism that manages the credit parameters; and
   an order matching engine that generates trades by matching orders contained in the order store subject to the limits of credit, the order matching engine being arranged to automatically chain together said orders, without instruction to do so from any of the parties, to generate a multi-legged chain of simultaneous trades, wherein the order matching engine is arranged to fully authorize the chain, to fully reject the chain or to partially authorize the chain by scaling down all the orders in the chain by an appropriate factor determined by the credit parameters.

2. The system of claim h wherein the financial instruments are financial derivatives.

3. The system of claim 2, wherein the financial instruments include underlying instruments and strategy instruments comprising two or more underlying instruments.

4. The system of claim 1, wherein the matching engine is adapted to chain together instruments based on both the order parameters and the credit parameters.

5. The system of claim 1, wherein the matching engine is adapted to allow the same party to be a party to more than one trade in the chain.

6. The system of claim 1, wherein the order matching engine is implemented as a single threaded process.

7. The system of claim 3, wherein the order matching engine is arranged to automatically chain together both the underlying and the strategy instruments to generate a multi-legged chain of simultaneous trades.

8. A computerized trading system for use in trading instruments between parties, comprising
   an accounts store that stores details of multiple trading accounts relating to at least some of the parties, the multiple trading accounts for each party defining respective multiple trading preferences for the party and being defined at multiple levels of a tree of trading accounts;
   an order matching engine that automatically generates trades by matching orders submitted by traders on behalf of the parties, the order matching engine being arranged to automatically chain together said orders, without instruction to do so from any of the parties, to generate a multi-legged chain of simultaneous trades; and a trade mechanism to post-process trades generated by the order matching engine, the trade mechanism being adapted to automatically select any of the trading accounts, of said multiple trading accounts, relating to the parties involved in a trade.

9. The system of claim 8, wherein the trade mechanism preferentially selects trading accounts of said multiple trading accounts, of the parties involved in a trade, which both relate to a single clearing system.

10. The system of claim 9, wherein:
    the order matching engine is adapted to match orders between first and second parties subject to credit parameters relating to the first and second parties to generate a trade between the parties, and the trade mechanism is adapted to automatically select a trading account of said multiple trading accounts related to each party and to post-process the trade using the selected trading accounts.

11. The system of claim 10, wherein the trade is split across one or more further trading accounts if insufficient credit is available to post-process a trade using the selected trading accounts of said multiple trading accounts.

12. The system of claim 8, wherein the trade mechanism allows each party to define one or more settlement parties and is adapted to route settlement of a trade to a settlement party commonly defined by two parties to a trade.

13. In a computerized trading system comprising an accounts store, an order store, a credit store and an order matching engine, a method of matching orders for financial instruments, submitted on behalf of trading parties, comprising:
    receiving and storing, in the accounts store, details of multiple trading accounts relating to at least some of the parties, the multiple trading accounts for each party defining respective multiple trading preferences for the party and being defined at multiple levels of a tree of trading accounts;
    receiving and storing, in the credit store, a plurality of credit parameters for each of the multiple trading accounts defining limits of credit for the trading account to determine the credit worthiness of trades between a party and other parties;
    receiving and storing, in the order store, a plurality of orders submitted on behalf of the parties for said financial instruments;
    in the order matching engine, generating trades by matching orders contained in the order store subject to the limits of credit, automatically chaining together orders to generate a multi-legged chain of simultaneous trades, without instruction to do so from any of the parties; and
    in the order matching engine, fully authorizing the chain, fully rejecting the chain or partially authorizing the chain by scaling down all the orders in the chain by an appropriate factor determined by the credit parameters.

14. The method of claim 13, wherein the step of automatically chaining together orders uses a single threaded matching process.

15. A method of electronically trading instruments between parties, in a computerized trading system, comprising an accounts store, an order matching engine and a trade mechanism, the method comprising:

the accounts store receiving and storing data defining multiple trading accounts for at least some of the parties, the multiple trading accounts defining respective multiple trading preferences for each party and being defined at multiple levels of a tree of trading accounts;

the order matching engine receiving and matching orders submitted by the parties to form trades by automatically chaining together said orders, without instruction to do so from any of the parties, to generate a multi-legged chain of simultaneous trades; and the trading mechanism automatically selecting, for at least some of the trades any of the trading accounts of said multiple trading accounts for the trading parties; and post-processing at the trade mechanism, the trade using the selected trading accounts.

16. The system of claim 8, wherein each order submitted on behalf of a party identifies a trading account of the multiple trading accounts of the party, and the trade mechanism is adapted to select the identified trading account, of said multiple trading accounts, relating to each party involved in a trade.

17. The system of claim 8, wherein the computerized trading system further comprises a clearing system preferences store for storing details of clearing system preferences for each party.

18. The system of claim 8, wherein the multiple trading preferences for a party include one or more of:
   a preference to trade with a specified counterparty;
   a preference to trade via a central counterparty;
   a preference to trade via a specified clearing system;
   a preference that a trade is notified to a third party; and
   a preference that a trade is novated into the name of a third party.

19. The method of claim 15, wherein each order submitted on behalf of a party identifies a trading account of the multiple trading accounts of the party, and the step of automatically selecting at the trade mechanism any of the trading accounts of said multiple trading accounts for the trading parties comprises automatically selecting the identified trading account, of said multiple trading accounts, relating to each party involved in the trade.

* * * * *